United States Patent
Igarashi et al.

(10) Patent No.: US 6,469,737 B1
(45) Date of Patent: Oct. 22, 2002

(54) IMAGE-SENSING SERVER AND CONTROL METHOD AND STORAGE MEDIUM THEREFOR

(75) Inventors: Masaru Igarashi, Chigasaki; Tadashi Yamakawa, Yokohama; Mamoru Sato, Tokyo, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/898,268

(22) Filed: Jul. 22, 1997

(30) Foreign Application Priority Data

Jul. 23, 1996 (JP) .............................................. 8-193730

(51) Int. Cl.⁷ .............................................. H04N 5/232
(52) U.S. Cl. ...................... 348/211; 348/14.1; 348/207; 709/224
(58) Field of Search .............................. 348/13, 15, 17, 348/18, 19, 384.1, 387.1, 390.1, 12, 7, 14.1, 14.12, 211, 212, 213, 552, 220, 222; 709/219, 217, 218, 299, 233, 223, 224, 232, 204; 455/4.2, 5.1; 370/229, 230, 235, 236, 260, 261, 263; 725/96

(56) References Cited

U.S. PATENT DOCUMENTS 4,769,811 A * 9/1988 Eckberg, Jr. et al. ......... 370/60
5,063,440 A * 11/1991 Hong ........................... 348/18

(List continued on next page.)

FOREIGN PATENT DOCUMENTS

| EP | 0715453 A2 | 6/1996 |
| JP | 63-164782 A | 7/1988 |
| JP | 2-209043 A | 8/1990 |
| JP | 04320183 A | 11/1992 |
| JP | 5-268296 A | 10/1993 |
| JP | A 6-205122 | 7/1994 |
| JP | A 6-233298 | 8/1994 |
| JP | 7-075092 A | 3/1995 |
| JP | 7-095200 A | 4/1995 |
| JP | 07121789 A | 5/1995 |
| JP | 7-152668 A | 6/1995 |
| JP | 7-203053 A | 8/1995 |
| JP | 07250322 A | 9/1995 |
| WO | WO 95/11566 | 4/1995 |
| WO | WO 96/02106 | 1/1996 |

OTHER PUBLICATIONS

Himonas et al., "A Multiple Access Control Protocol for an Interactive Multimedia Network", IEEE, 5/96, pp. 262–266.
Robinson et al., "A MIB For Video Server System Management", IEEE, 1995, pp. 109–115.
Little et al., "Client–Server Metadata Management for the Delivery of Movies in a Video–On–Demand System", IEEE, 5/94, pp. 11–18.
JPA 6–205122 English Abstract.
JPA 6–233298 English Abstract.
Goldberg et al., "Beyond the Web: Excavating the Real World Via Mosaic", Second International WWW Conference, 10/17–21/94. pp. 1–15.
Japanese Office Action dated Mar. 22, 2002.
English Abstract of JP 07250322 A.
English Abstract of JP 07121789 A.
English Abstract of JP 04320183 A.

Primary Examiner—Wendy R. Garber
Assistant Examiner—Aung S. Moe
(74) Attorney, Agent, or Firm—Morgan & Finnegan, LLP

(57) ABSTRACT

An image-sensing server performs moving-image transfer service by sequentially transferring live video images obtained by a video camera via a general network such as the Internet. When live video images are requested from an external device as a client on the network, a system controller controls data-transfer amount per unit time of an image obtained by image sensing by the video camera, in accordance with traffic status on the network, and transfers the image data to the external device.

21 Claims, 21 Drawing Sheets

U.S. PATENT DOCUMENTS

| | | | |
|---|---|---|---|
| 5,115,429 A | * 5/1992 | Hluchyj et al. | 370/84 |
| 5,193,151 A | * 3/1993 | Jain | 370/230 |
| 5,375,068 A | * 12/1994 | Plamer et al. | 370/260 |
| 5,379,297 A | * 1/1995 | Glover | 370/60.1 |
| 5,444,482 A | * 8/1995 | Misawa et al. | 348/220 |
| 5,459,520 A | * 10/1995 | Sasaki | 348/445 |
| 5,517,652 A | * 5/1996 | Miyamoto et al. | 364/940.92 |
| 5,579,301 A | * 11/1996 | Ganson | 370/17 |
| 5,592,302 A | * 1/1997 | Hirabayashi | 358/433 |
| 5,640,202 A | * 6/1997 | Kondo et al. | 348/222 |
| 5,674,003 A | 10/1997 | Andersen et al. | |
| 5,706,434 A | 1/1998 | Kremen et al. | |
| 5,729,471 A | 3/1998 | Jain et al. | 364/514 A |
| 5,742,329 A | * 4/1998 | Masunaga et al. | 348/15 |
| 5,742,762 A | 4/1998 | Scholl et al. | |
| 5,758,085 A | 5/1998 | Kouoheris et al. | |
| 5,778,187 A | 7/1998 | Monteiro et al. | 395/200.61 |
| 5,790,792 A | 8/1998 | Dudgeon et al. | |
| 5,822,537 A | * 10/1998 | Katseff et al. | 370/231 |
| 5,839,905 A | 11/1998 | Redford et al. | 434/307 R |
| 5,848,415 A | * 12/1998 | Guck | 707/10 |
| 5,859,979 A | * 1/1999 | Tung et al. | 348/222 |
| 5,870,093 A | 2/1999 | Martin et al. | 345/354 |
| 5,878,219 A | 3/1999 | Vance, Jr. et al. | 395/200.47 |
| 5,956,482 A | 9/1999 | Agraharam et al. | 395/200.33 |
| 5,982,362 A | 11/1999 | Crater et al. | 345/327 |
| 6,067,571 A | * 5/2000 | Igarashi et al. | 709/232 |
| 6,122,005 A | 9/2000 | Sasaki et al. | 348/211 |

* cited by examiner

FIG.3

| IMAGE-SENSING TIME | ACCEPTANCE CODE | IMAGE-SENSING CONDITION | IMAGE FORMAT |
|---|---|---|---|
| 1996.7.6.13.15 | 12543 | P25T0Z3 | gif |

FIG.4

| ACCEPTANCE CODE | IMAGE FORMAT | IMAGE DATA |
|---|---|---|
| 12543 | gif | 0100011101001001...... |

FIG.6

| IMAGE-SENSING TIME | END TIME | INTERVAL TIME | ACCEPTANCE CODE | IMAGE-SENSING CONDITION | IMAGE FORMAT |
|---|---|---|---|---|---|
| 1996. 7. 6. 13. 15 | 1996. 7. 6. 13. 45 | 15 | 12543 | P25T0Z3 | gif |

FIG.17

| ACCEPTANCE CODE | | IMAGE FORMAT | IMAGE DATA |
|---|---|---|---|
| 12543 | 1 | gif | 0100011101001001........ |
| 12543 | 2 | gif | 0010010011100........ |
| 12543 | 3 | gif | 00110........ |
| | | | |

FIG.18

| IMAGE-SENSING TIME | ACCEPTANCE CODE | IMAGE-SENSING CONDITION | IMAGE FORMAT |
|---|---|---|---|
| 1996.7.6.13.15 | 12543 | 1 | P25T0Z3 | gif |
| 1996.7.6.13.15 | 12543 | 2 | P30T0Z3 | gif |
| 1996.7.6.13.15 | 12543 | 3 | P35T0Z3 | gif |
| | | | | |

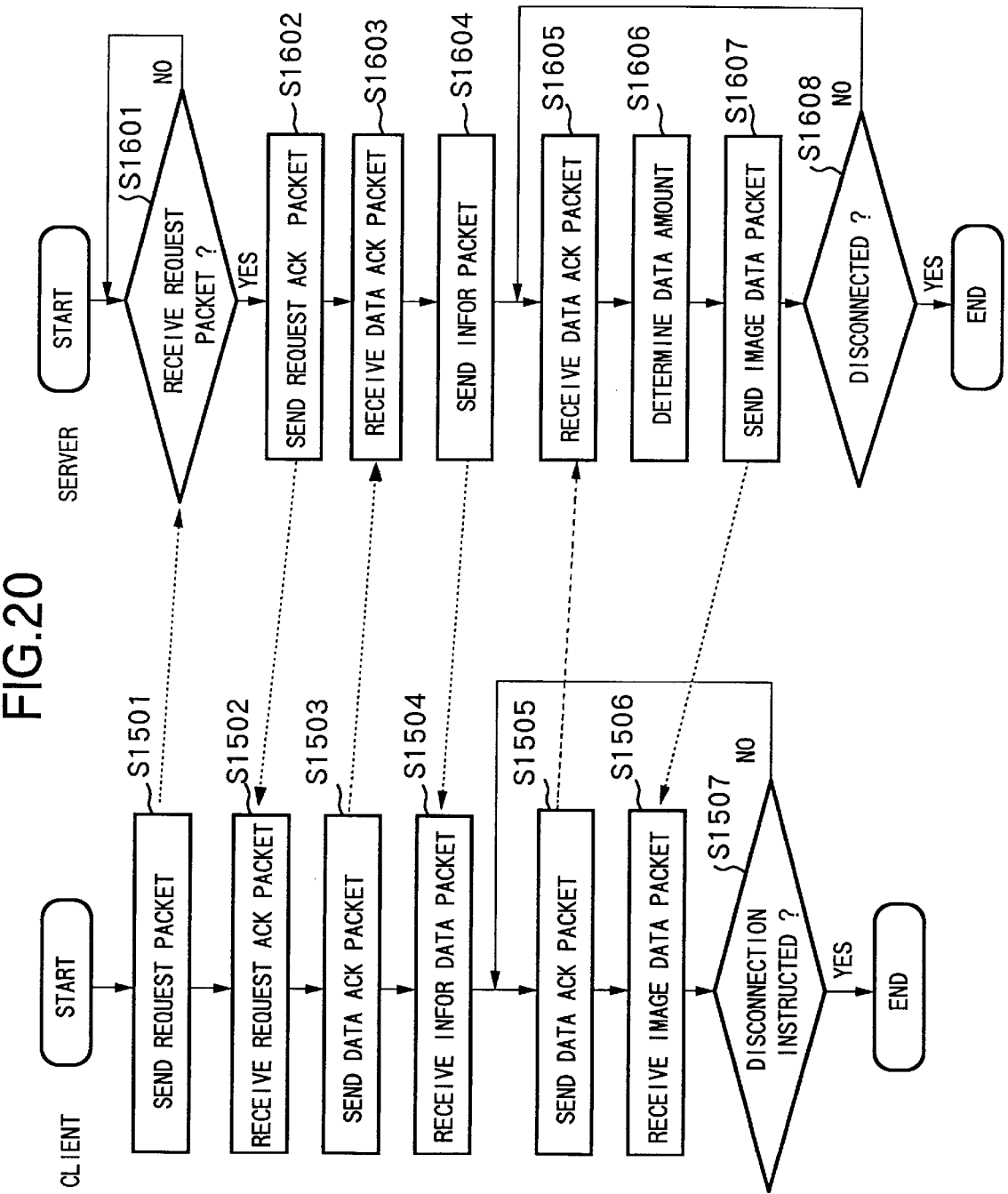

IMAGE-SENSING SERVER AND CONTROL METHOD AND STORAGE MEDIUM THEREFOR

BACKGROUND OF THE INVENTION

This invention relates to an image-sensing server and method and a storage medium and, more particularly to an image-sensing server and method and a storage medium for transferring a sensed video image to a remote client via a network.

A camera control system for controlling a camera (e.g., panning, tilting and zooming of the camera) from a remote place is widely known.

In this system, even though camera control is performed via a network, a device for camera control and a client device do not depend on common specification but on unique specifications (e.g., protocol and control information).

However, in recent years, the Internet has been becoming popular with rapidity, and there is an increasing need from end users to see video images sensed by a camera at a remote place via the Internet.

Also, there is a need to obtain video images currently image-sensed at a remote place in realtime, by sequentially transferring obtained video images.

If this transfer is realized, it is possible to obtain in realtime video images of remote sights while staying at home, or even obtain video images of foreign countries in accordance to circumstances.

However, to meet the above requirements, it is necessary to solve various problems.

Above all, in a large-scale network such as the Internet, once the traffic on the network becomes overcrowded, the data transfer speed becomes slow, and moving image cannot be naturally reproduced.

To solve this problem, the system may be arranged to temporarily store a video image sensed by a camera as an image file into a predetermined storage device, and transfer the image file in accordance with a file-transfer protocol; on the end user side, the file is temporarily stored and is reproduced later.

However, the video image reproduced on the user end side is not a video image, which the user end wanted to see, but merely a video image obtained in advance. This cannot be a "Live video image".

SUMMARY OF THE INVENTION

The present invention has been made in consideration of the above situation, and has its object to provide an image-sensing server and method which enables moving-image transfer service by sequentially transfer live video images obtained by a video camera, via a general network such as the internet.

According to the present invention, the foregoing object is attained by providing an image-sensing server, connected to a general network, capable of controlling image-sensing means, comprising: transfer means for transferring a series of video images, obtained by the image-sensing means, to a client device on the network, as a moving image; detection means for detecting the degree of traffic congestion on the network; and control means for controlling a data amount of video images transferred by the transfer means, in accordance with the result of detection by the detection means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of a data format in a reservation register according to the first embodiment;

FIG. 4 is a table showing an example of a management format for data stored in an image memory according to the first embodiment;

FIG. 6 is a table showing an example of a data format in a reservation register according to a third embodiment of the present invention;

FIG. 17 is a table showing an example of a data storage format in a reservation register according to the third embodiment of the present invention;

FIG. 18 is a table showing an example of a data storage format in a reservation table according to the fifth embodiment;

FIG. 20 is a flowchart showing a moving-image transfer procedure between a client and a server according to the seventh embodiment.

DETAILED DESCRIPTION OF THE PREFERRED EMBODIMENTS

Preferred embodiments of the present invention will now be described in detail in accordance with the accompanying drawings.

<First Embodiment>

Figure 1:
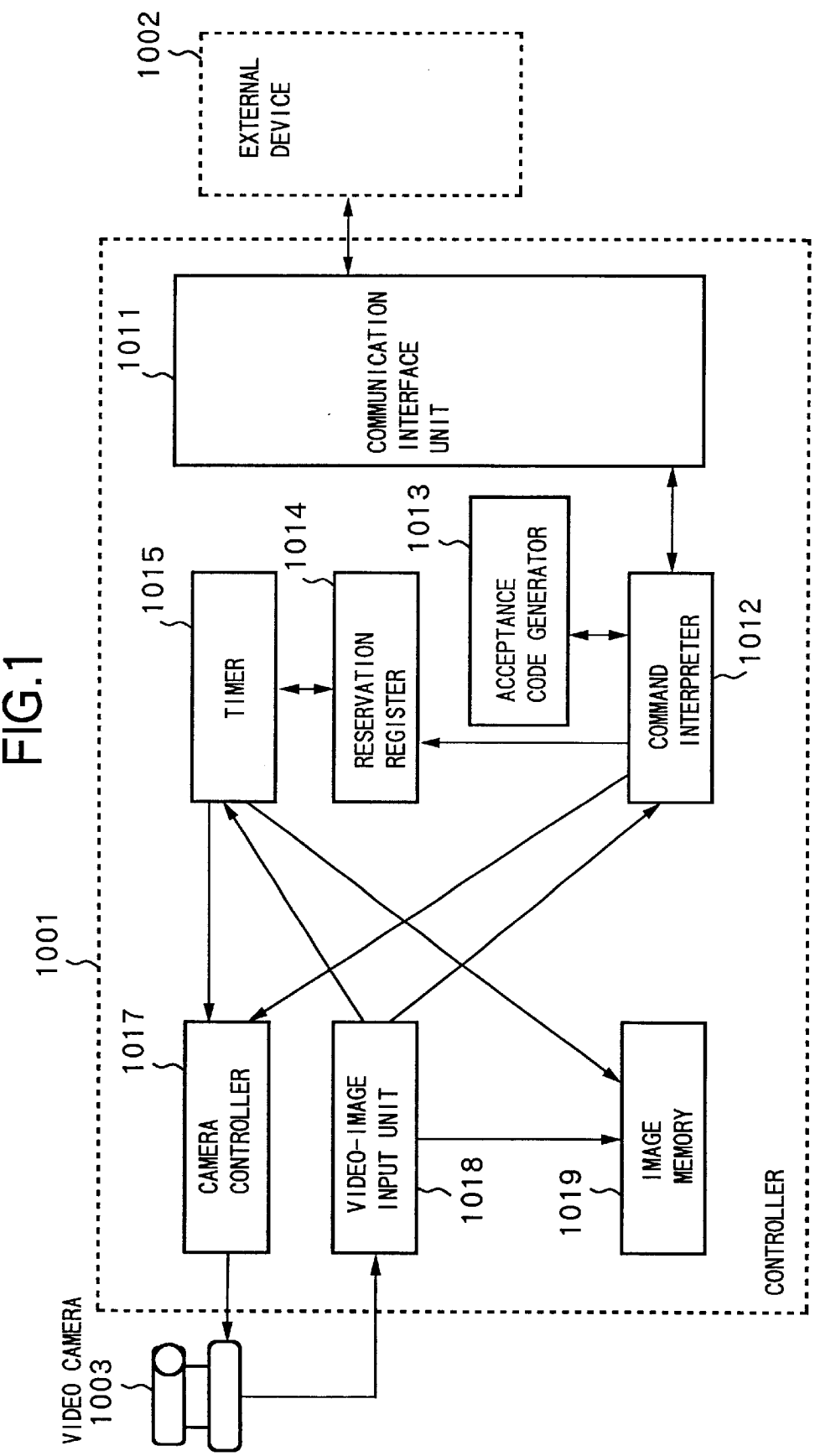
FIG. 1 is a block diagram showing a camera control apparatus according to a first embodiment of the present invention.

FIG. 1 is a block diagram showing the construction of a camera control apparatus according to a first embodiment of the present invention. In FIG. 1, reference numeral 1001 denotes a camera control apparatus, basically comprising a personal computer, for example. Numeral 1003 denotes a video camera (hereinafter simply referred to as "camera") as the object of the control by the camera control apparatus 1001. The content of control includes control of image-sensing condition such as panning, tilting, exposure and the like as well as zooming. For the control, the camera 1003 has a panhead (not shown). The camera 1003 and the camera control apparatus 1001 are connected to each other via, e.g., an RS232C interface generally used in a personal computer. Note that the video information obtained by the camera 1003 is outputted to the camera control apparatus 1001 via a dedicated cable which is specially provided.

The camera control apparatus 1001 has the following construction.

Numeral 1017 denotes a camera controller which outputs various control signals via the above interface; 1018, a video-image input unit which inputs a video image sensed by the camera 1003 by using an image capture device or the like; 1011, a communication interface unit for the camera control apparatus 1001 to exchange information with another apparatus by using a network adapter or the like. Besides these resources, the camera control apparatus 1001 comprises a command interpreter 1012, which is realized as a program or memory data utilizing the various resources such as a CPU, a storage device and an auxiliary storage device of a computer, an acceptance code generator 1013, a timer 1015, an image memory 1019, and a reservation register 1014.

Numeral 1002 denotes an external device such as a WWW (World Wide Web) server or a WWW browser for communication by the HTTP. (Hyper-Text Transfer Protocol) protocol. That is, a WWW browser sends a request in accordance with a URL (Uniform Resource Locator) indicating the storage destination of desired data to a WWW server, which is a storage of document data and image data. In response to the request, the WWW server returns corresponding document data or image data to the WWW browser.

In the present embodiment, the communication interface unit 1011 uses a method realized by the WWW servers. That is, communication is performed by the HTTP protocol, and the camera control apparatus 1001 behaves as if it is a WWW server. This is possible by applying the WWW server's communication method to the present control apparatus.

Generally, when image data is pasted in a WWW document, the request command is described as follows:
<img src="http://www.foo.co.jp/image001.gif">
 (A character string in quotation marks " " is described as single string without any line-feed/new paragraph mark.)

This means that it is requested to transfer image data stored in a file "image001.gif" in a WWW server "www-.foo.co.jp". The browser displays the image transferred from the WWW server on its display window image.

The present embodiment performs remote camera control while utilizing the above specification.

That is, in the present embodiment, a character string corresponding to the above file name is interpreted as a command. Specifically, camera-angle destination such as panning, tilting and zooming are represented by alphabets "P", "T" and "Z" respectively, then, respective control amounts are represented by numerical values.

Assuming that the camera 1003 has a pan angle from −50° to 50°, a tilt angle from −20° to 20° and 1 to 8 times zooming, when image sensing is performed with a pan angle of 20°, a tile angle of 5° and twice zooming, and the obtained image is pasted as "gif" format image data, the description is as follows (note that the network address of the present camera control apparatus is cam.www.co.jp):
<img src="http://www.foo.co.jp/P20T5Z2.gif">

The external device 1002, which is a WWW server or the WWW browsers, outputs the above character string in HTML (Hyper-Text Markup Language) description to the camera control apparatus 1001, requiring the image data.

When this request enters the camera control apparatus 1001 via the communication interface unit 1011, the command interpreter 1012 is activated to start interpretation of the request (the above HTML character string) and processing of a response to the request.

Figure 2:
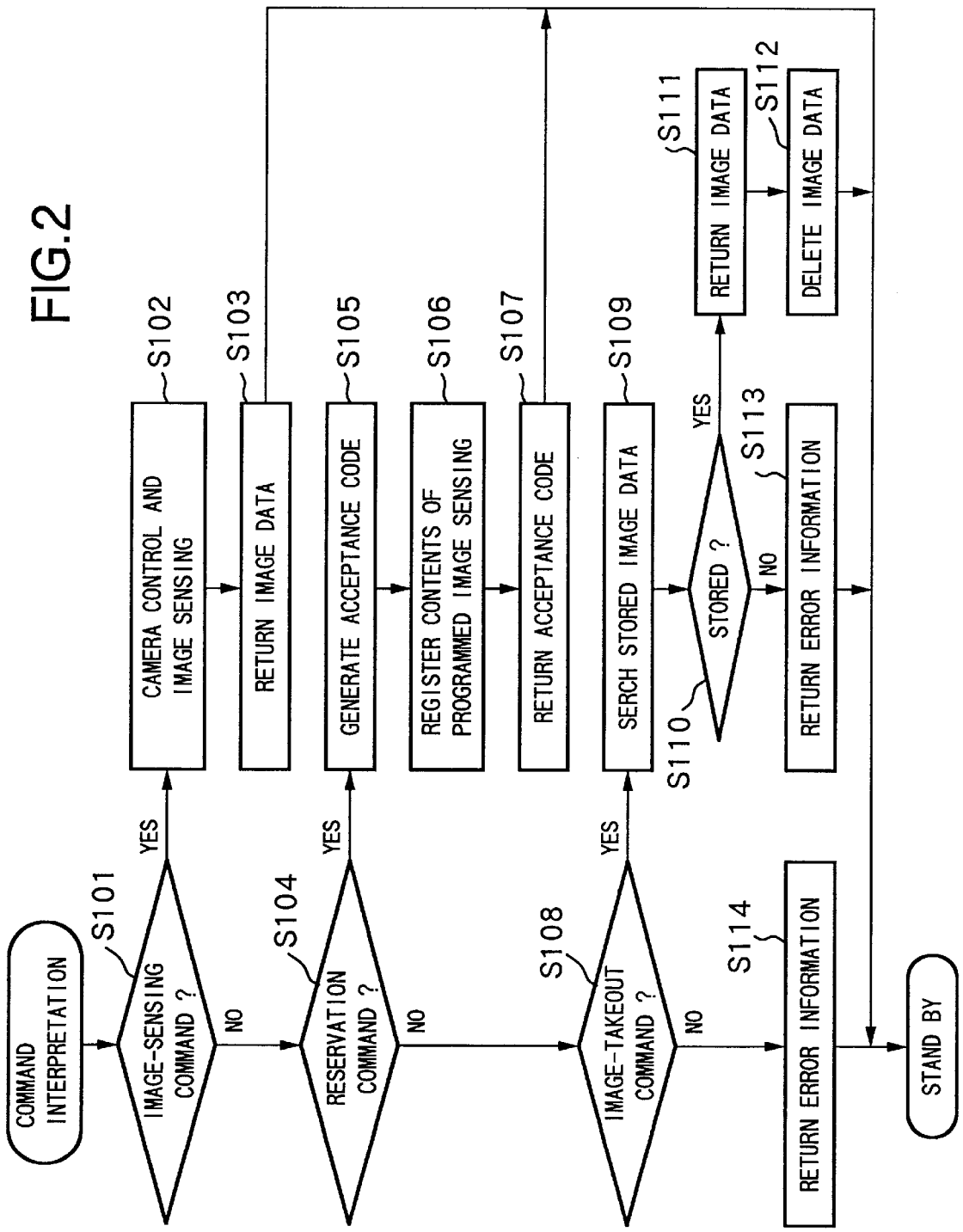
FIG. 2 is a flowchart showing a process procedure of a command interpreter according to the first embodiment.

FIG. 2 is a flowchart showing an example of the processing.

First, at step S101, the command described as a file name is interpreted. That is, if the head of the request is "P", the command is recognized as an image-sensing command, then process proceeds to step S102.

At this step, the camera 1003 is controlled by the camera controller 1017 based on the designated pan, tilt and zoom values. The obtained image is captured by the video-image input unit 1018, and converted into data of the designated image format, then sent to the external device 1002 requiring the image data, via the communication interface unit 1011. The external device 1002 stores the image data, and transfers the image data to the initial request originator.

At this time, as the communication interface unit 1011 uses the HTTP protocol, content-type information and status information corresponding to the image format are added to the head of the image data. Then, the process ends.

Thus, the obtained video image is displayed in the HTML document as if it is image data stored in a file in the WWW server.

In the command interpretation at step S101, if the head of the request is "R", the command is recognized as a reservation command designating image-sensing time. Then, the process proceeds to step S105 via the determination of image-sensing condition at step S104.

The reservation command starts with "R"; then it continues with integers indicating year, month, day, hour, and minute, each terminated with a period, and with designation of panning, tilting and zooming as image-sensing condition; finally it ends with a name (an extension) indicating the image format. Note that if it has no image-sensing condition, the camera angle at the designated image-sensing time is employed.

For example, if video-image sensing is programmed with image-sensing time of 13:15 on Jul. 6, 1997, a pan angle of 25°, a tilt angle of 0° and a 3 times zooming, in gif format, the reservation is described as follows:
<img src="http://www.foo.co.jp/R1996.7.6.13.15.P25T0Z3.gif">

When the above reservation command is designated, a unique identification number is received as an acceptance code (code indicating that reservation is accepted) from the acceptance code generator 103 at step S105. The acceptance code may be a count value which is incremented by one (+1) at each request generated, or may be a numerical value indicating the designated time (year, month, date and time).

Then, at step S106, the acceptance code and information on the designated time, the image-sensing condition and the image format are registered into a storage device (not shown) of the reservation register 1014. At step S107, the acceptance code is returned via the communication interface unit 1011 to the external device 1002 which issued the reservation command, further, toward the end user.

Note that at this time, to indicate that the response is an acceptance code, content-type information and status information are added to the head of the code. Then the process ends.

However, if an HTML document including such image-sensing reservation is simply generated but a general WWW browser is used to display the obtained image, the acceptance code instead of image data is returned and an image is not displayed.

However, if image-sensing is reserved with respect to the camera control apparatus 1001 by using a CGI program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

That is, when the designated time registered in the reservation register 1014 has come, the camera control apparatus 1001 controls the camera 1003 at the registered camera angle to perform the programmed image sensing, and stores the obtained image data in the designated format with an appropriate name, e.g., an acceptance code, as a file name, into the image memory 1019. Thereafter, when an image read command (including an acceptance code) is sent from the external device 1002, image data corresponding to the read command is read from the image memory 1019, and transferred in the designated format to the external device 1002, and the terminal of the end user (WWW browser).

Note that the image read command starts with alphabet "G", then continues with the acceptance code, and ends with the extension indicating the image format.

The acceptance code is returned to the external device 1002 upon reservation. For example, if "12543" is returned as an acceptance code, to read the image obtained by programmed image sensing, the following description is used:

<img src="http://www.foo.co.jp/G12543.gif">

Various information is stored into the storage device of the reservation register 1014 in the format of a table, e.g. as shown in FIG. 3. Note that in the present embodiment, the reservation register 1014 uses its own storage device, however, the reservation register 1014 may use the image memory 1019 of the camera control apparatus 1001 or any other storage device.

Note that the character string ("gif" in this case) meaning image formation, added to the end of the image read command must be basically the same as that of the reservation command. If different character string is used in the read command, however, it may be arranged such that the camera control apparatus 1001 converts the image stored in the image memory with the reservation code into a newly designated format data and transfers the converted data.

Returning to FIG. 3, in the above reservation, the acceptance code is "12543". That is, in FIG. 3, the reservation data indicates, first, image-sensing time, the acceptance code, image-sensing condition, and an image format.

The image memory 1019 is managed in the format as shown in FIG. 4, where an acceptance code (issued in correspondence with a reservation command, having a meaning equivalent to a file name), an image format, and actual image data are stored. Note that the image memory 1019 may be a storage device of any format, preferably having a sufficient capacity; for example, the image memory 1019 may be a hard disk device, a magneto-optical disk device and the like.

Next, the process procedure of the camera control apparatus of the present embodiment when it as received an image read command will be described.

In the command interpretation at step S101, if the head of the command is "G", the process proceeds to step S104, at which it is determined whether or not the command is a reservation command. Since the command is not a reservation command (NO at step S104) in this case, the process proceeds to step S108. As it is determined at step S108 that the command is an image read command, the process proceeds to step S109, at which corresponding data stored in the image memory 1019 is searched based on the acceptance code included in the image read command.

Then, at step S110, it is determined whether or not the data obtained by the above search has the same value of the acceptance code described as the image read command. If YES, the image data is read, and transferred via the communication interface unit 1011 to the external 1002 requesting the image data.

Also at this time, as the communication interface unit 1011 uses the HTTP protocol, content-type information and status information corresponding to the image format are added to the head of the image data (step S111).

At step S112, data in the storage area of the image memory 1019, from which the image data has been read out, is deleted. Then the process ends.

If it is determined at step S110 that image data corresponding to the designated acceptance code is not stored, as the programmed image sensing has not been performed and corresponding image has not been obtained otherwise the image data has been already transferred and deleted from the image memory, error information is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

As described above, information exchange is performed between the external device 1002 and the camera control apparatus 1001 of the present embodiment.

Next, the timer 1015, used for performing camera control and storing the result of image-sensing, based on reservation data registered in the reservation register 1014, will be described.

In the timer 1015, at intervals of a predetermined period, e.g., one minute, a timer program is activated. This program is realized by utilizing a timer of a computer or the like.

Figure 5:
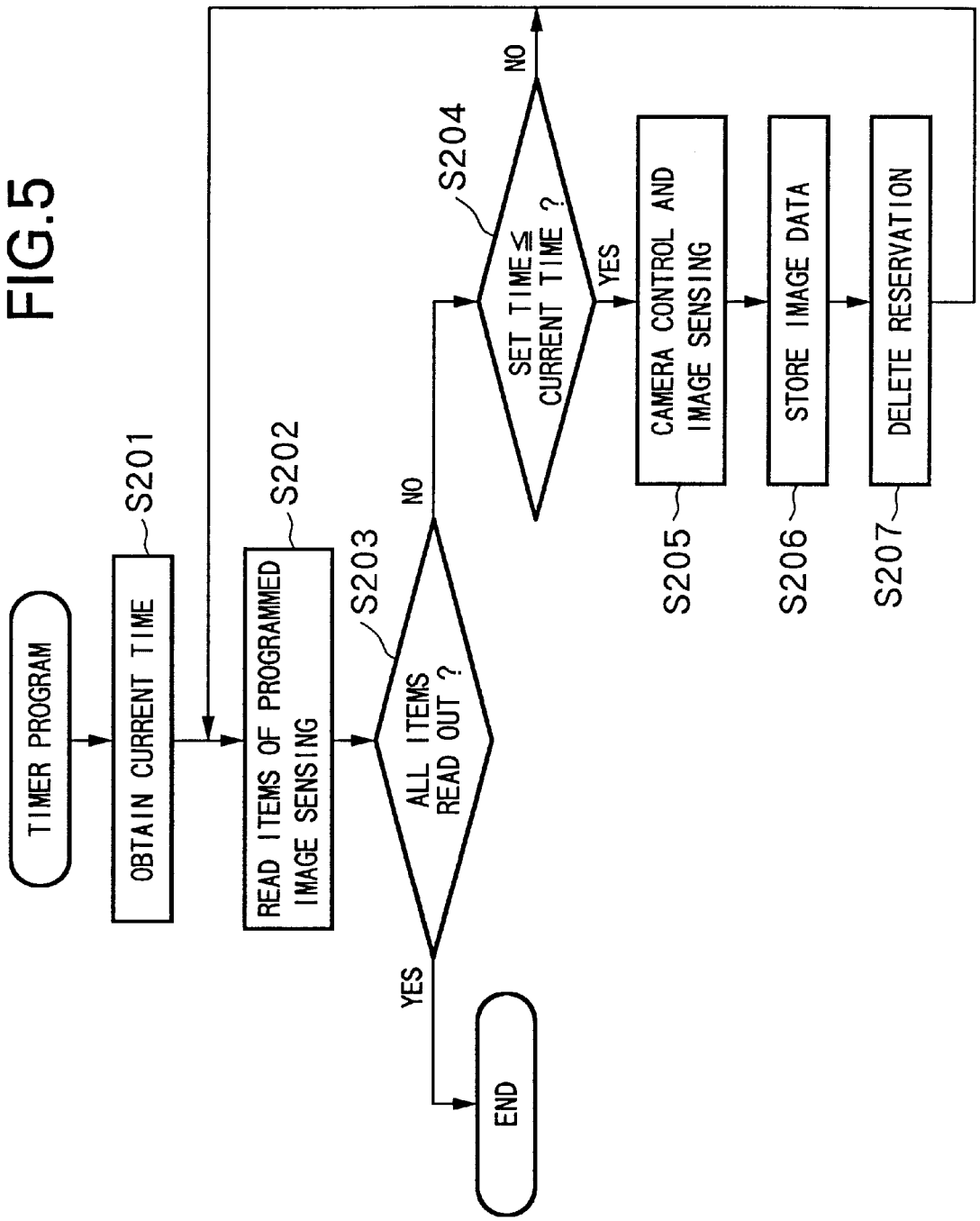
FIG. 5 is a flowchart showing a process procedure of a timer according to the first embodiment.

The operation of the timer program will be described with reference to the flowchart of FIG. 5.

First, at step S201, the current time is read from a timer of the camera control apparatus 1001, and the process proceeds to step S202.

At step S202, reserved contents, i.e., items of programmed image sensing sequentially registered in a respective row of the table of the storage device are read from the reservation register 1014. When it is determined at step S203 that all the items of programmed image sensing have been read out, the process ends, otherwise, the process proceeds to step S204, at which it is determined whether or not the designated time in the reserved data is in the future. If it is determined that the current time is not the designated time yet, the processing at step S202 and the subsequent steps is repeated.

On the other hand, if it is determined at step S204 that the current time is the designated time or past the designated time, the process proceeds to step S205, at which the camera 1003 is controlled to perform image sensing, by the camera controller 1017, in accordance with the image-sensing condition of the items of the programmed image sensing read from the reservation register 1014. Then, the obtained image is converted into image data of the image format designated by a corresponding item of the programmed image sensing. At step S206, the image data is stored, with an acceptance code and image format information, into the image memory 1019. As a result, the image data in the format as shown in FIG. 4 is attached.

Next, at step S207, the read items of programmed image sensing are deleted from the reservation register 1014, and the process returns to step S202 to repeat the processing.

As described above, image sensing is performed as programmed, and the result of the image sensing is stored, thereafter, when an image read command is sent from the external device 1002, the image data is returned in response to the command.

As described above, a live image obtained by controlling a remote camera can be easily pasted in a WWW document by connecting the camera control apparatus of the present embodiment to a network of the WWW system, and describing a URL where description of image-sensing condition is added to the address of the camera control apparatus, as the source of the image data. Note that if only pasting the image data in a WWW document is performed, the acceptance code generator 1013, the timer 1015, the image memory 1019 and the reservation register 1014 are unnecessary, and step S104 and the subsequent steps of the processing by the command interpreter 1012 are unnecessary.

Further, by providing the timer 1015, the image memory 1019 and the reservation register 1014, programmed image sensing can be reserved, and later the result of image sensing can be taken into a WWW page and the image can be displayed in the WWW page, by utilizing a CGI program of a WWW server or the like. Especially, if image sensing is tried by controlling a remote camera when the network is overcrowded, image transfer takes much time and cannot smoothly provides image data. However, according to the present embodiment, image sensing in such time is programmed with specific camera angle for a necessary period, and the programmed image sensing is reserved, thereafter, stored image data can be read when the network becomes less crowded, e.g., at midnight.

Especially, image sensing can be performed plural times with the same camera angle at short intervals regardless of the transmission capacity of the network.

Note that the HTTP protocol is used as the interface between the camera control apparatus 1001 and the external device 1002, however, any other communication interface can be used.

Note that the acceptance code is used to identify sensed image data corresponding to the reservation of programmed image sensing, however, it may be arranged such that, instead of using the acceptance code generator, a unique request code is generated on the external device 1002 side (end user side) as a part of a reservation command, then the camera control apparatus 1001 identifies the image data by the correspondence between the request code and the external device 1002.

Further, it may be arranged such that upon notifying the above request code to the image-requesting side, a password is issued, and when the image data is read, the image data can be transferred to the image-requesting side by the reservation code with the password. This avoids at least the inconvenience that a third person sends an image transfer request with accidentally the same reservation code and the file is transferred to the third person then deleted.

Further, image-sensing time is designated in minute unit, however, it may be designated in second or millisecond unit.

In the present embodiment, to indicate the image format, the extension "gif" is employed. It may be arranged such that the image format indicated by the extension "gif" is arbitrarily changed for a JPEG format indicated by an extension "jpg".

Further, the file name is regarded as a command, however, a parameter description of a URL can be utilized.

For example, panning, tilting, zooming and image format are respectively set to "25°", "5°", "twice" and "gif", image sensing can be programmed by the following description:
<img
src="http://www.foo.co.jp/cameraimage?P=20,T=5,Z=2, F=g
if">

Further, a WWW server may be installed into the camera control apparatus of the present embodiment. In this case, for example, a name "camctl.exe" is given to the program of the command interpreter 1012 as a CGI program for the WWW server, and the image sensing can be programmed by the following description:
<img src="http://www.foo.co.jp/cgibin/camctl.exe?P=20, T=5,Z=2,F=gif">

Furthermore, in the present embodiment, once the image data obtained by programmed image sensing has been transferred, the image data (file) is deleted, however, the image data is not necessarily deleted at this time.

That is, it may be arranged such that the image data, obtained by programmed image sensing and stored as a file, is held for an appropriate period, and when the period has elapsed, the image data is deleted even if the image data has not been transferred. This allows a plurality of end users to obtain the same image.

Further, it may be arranged such that a password is issued to an end user according to circumstances, and the image data is transferred only when the password coincides with that of the image data.

<Second Embodiment>

In the above first embodiment, programmed image sensing can be reserved for only one image.

Next, a second embodiment will be described a an example where a plurality of reservation commands are combined into a single file name, and a file extension indicating the image format is added to the file name, so as to reserve programmed image sensing with a plurality of image-sensing times and/or a plurality of camera angles.

For example, if image sensing is programmed with image-sensing times of 13:15, 13:30 and 13:45 on Jul. 6, 1997, a pan angle of 25°, a tilt angle of 0°, 3 times zoom ratio, with intention to read three images in "gif" format later, the reservation is described as follows:

```
<img
src="http://www.foo.co.jp/R1996.7.6.13.15P25T0Z3+
   R1996.
7.6.13.30P25T0Z3+R1996.7.6.13.45P25T0Z3.gif">
```

Note that if the image sensing is performed plural times at the same time or on the same date or at the same camera angle, the corresponding information in the character string may be omitted. For example, the above reservation command may be described as follows:

```
<img
src="http://www.foo.co.jp/R1996.7.6.13.15P25T0Z3+R . . .
30+R . . . 45.gif">
```

Note in the above description, each period means omission of the same numerical value as the initially set numerical value (in this case, year, month, day, hour and minute). This reduces the amount of information by omitting corresponding information such as date.

The basic construction of the second embodiment is substantially the same as that of the first embodiment except the following changes.

That is, in the process procedure of the command interpreter 1012, steps S106, S111 and S112 are executed in accordance with the command including the above description indicated by "+".

In accordance with the command interpretation, image data are stored in accordance with acceptance codes "12543-1", "12543-2" and "12543-3", as shown in FIG. 17, from the acceptance code in the reservation table as shown in FIG. 3. Note that the acceptance code transferred to the WWW browser is only "12543". Thereafter, when an image read command is received, image data having the common part of the acceptance codes ("12543" in this case) are found. The image data are re-formatted in the order of the numerals after the hyphen of the common part of the acceptance codes, into a single image data indicating a plurality of images, and the image data is returned via the communication interface unit 101 to the external device 1002 requesting the image data. The above reformat of plural image data as a single image data is realized by, e.g., combining image data sequentially.

At this time, as the communication interface unit 1011 uses the HTTP protocol, content-type information and status information corresponding to the image format are added to the head of the image data.

At step S112 according to the second embodiment, the data in the storage areas in the image memory 1019, from which the plurality of image data have been read, are deleted.

The above construction enables to program image sensing, at a plurality of camera angles or image-sensing times at one time, and handles a plurality of image data obtained by the plurality of programmed image sensing as a single image data file comprising a plurality of images, thus unnecessitates management of a plurality of acceptance codes corresponding to the respective images.

Further, if this technique is applied to interval image sensing such as a record of a plant's growth, an image file containing a series of images can be handled as a pseudo moving image.

Note that in this case, the plurality of image data are not combined, but sequentially transferred.

It goes without saying that applications of the present embodiment is similar to the first embodiment.

<Third Embodiment>

In the above second embodiment, in case of image sensing at fixed intervals, reservation commands must be combined corresponding to the number of image sensings.

Next, a third embodiment will be described as an example where, in the reservation command, immediately after the designated time end time and interval time are added, and then image-sensing condition such as a camera angle and the image format are designated, to reduce the amount of information to be set. In this embodiment, the end time is designated by numerical values following alphabet "t", and the interval time is designated by numerical values following alphabet "e" in minute unit.

For example, in a case where image sensing is programmed with image-sensing time of 13:15 and 13:45 on Jul. 6, 1997, a pan angle of 25°, a tilt angle of 0° and 3 times zooming, with intention to read three images later, the reservation command is described as follows:

```
<img
src="http://www.foo.co.jp/R1996.7.6.13.15t1996.7.6.13.
45e15P25T0Z3.gif">
```

As described above, if the image-sensing date or time are the same, the description of these image-sensing date or time can be omitted. In such case, the reservation command is described as follows:

```
<img
src="http://www.foo.co.jp/R1996.7.6.13.15t . . . 45e15P25
T0Z3.gif">
```

The basic construction of the third embodiment is substantially the same as that of the first embodiment except the following changes.

That is, in the process procedure by the command interpreter 1012, steps S106, S111 and S112 are changed in accordance with the above reservation command. Further, step S207 in the timer program executed by the timer 1015 is changed in accordance with the above reservation command.

Further, in this case, the table format registered in the reservation register 1014 is as shown in FIG. 6.

That is, the end time and interval time of image sensing are added to the record in FIG. 3.

On the other hand, at step S106 in the command interpretation, if the reservation command has end time and interval time, the reservation is registered as programmed image sensing with the end time, the interval time, with the time of reservation as image-sensing time, and the image format, into the reservation register 1014 with the acceptance code.

Further, if the requested reservation command indicates simple reservation without end time and interval time, the image-sensing time is set as the end time, and the interval time is set to "1".

At step S111, a plurality of image data registered as "12543-1", "12543-2" . . . , having the same common part of acceptance code, similar to the second embodiment, are read, then re-formatted as a single image data including a plurality of image data, and returned via the communication interface unit 1011 to the external device 1002 requesting the image data.

At the time, as the communication interface unit 1011 uses the HTTP protocol, content-type information and status information corresponding to the image format is added to the head of the image data.

At step S112, data in the storage areas in the image memory 1019, from which the plurality of image data have been read, are deleted.

On the other hand, at step S207 in the timer program, the registered reservation information is updated with information obtained by adding the interval time in the read items of the programmed image sensing, and if the updated image-sensing time is behind the end time, the item of the image-sensing time is deleted from the reservation register 2014.

More specifically, the timer 1015 checks the contents of reservation at intervals of one minute. If the timer 1015 determines that the current time is the image-sensing time in FIG. 6, or the image-sensing time has passed (error is allowable within one minute), the image-sensing condition "P25T0Z3" is forwarded to the camera controller 1017 to perform image sensing. Then one of data as shown in FIG. 17 is stored in the image memory 1019. In FIG. 6, the interval time "15" is added to the image-sensing time "1996.7.6.13.15", thus the image-sensing time is updated to "1996.7.6.13.30", as preparation for the next image sensing. As a result, when the image-sensing time has passed the end time, the data in FIG. 6 is deleted.

The above construction enables to easily perform interval image sensing by a short reservation command.

Especially, when interval image sensing is performed for a long period, the second embodiment cannot substantially perform the image sensing due to the lengthiness of the reservation command. However, the third embodiment easily performs such image sensing if the memory capacity for storing image data is sufficient.

<Fourth Embodiment>

The third embodiment reads the result of interval image sensing as a plurality of still image data. Next, an example of reading the result of interval image sensing as moving image data will be described as a fourth embodiment.

Upon reading the result of interval image sensing as moving image data, the file extension is set to "mpg". For example, the reservation command is as follows:
<img src="http://www.foo.co.jp/R1996.7.6.13.15t . . . 45e15P25 T0Z3.mpg">

Figure 7:
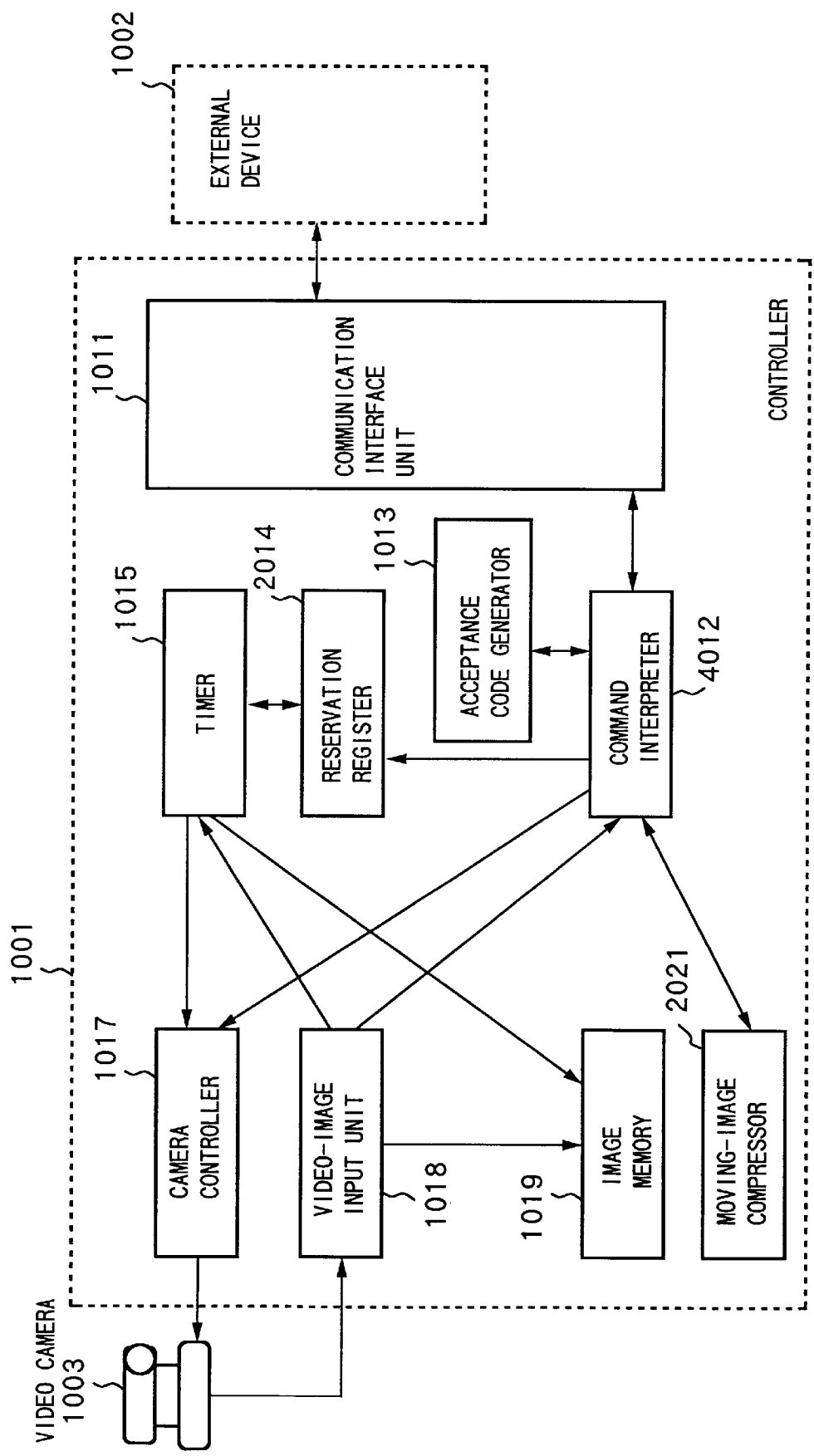
FIG. 7 is a block diagram showing the construction of the camera control apparatus according to a fourth embodiment of the present invention.

FIG. 7 shows the basic construction of the camera control apparatus according to the fourth embodiment. As shown in FIG. 7, the fourth embodiment has substantially the same construction as that of the first embodiment except the following changes.

That is, a moving-image compressor 2021 such as an MPEG1 compressing unit is added, and the command interpreter 4012 which interprets the file extension "mpg" is provided in place of a command interpreter 1012.

In this embodiment, at step S111 of the command interpretation process procedure, if the designated image format is a still image format such as "jpg" or "gif", a plurality of image data registered with the same reservation code are read, then, they are reformatted into a single image data including a plurality of image data, and the image data is returned via the communication interface unit 1011 to the external device 1002 requesting the image data.

At step S111, if the designated image format is "mpg", a plurality of image data registered with the same reservation code are read, then the images are compressed by the moving-image compressor 2021, and the compressed moving image data are returned via the communication interface unit 1011 to the external device 1002 requesting the image data.

At this time, as the communication interface unit 1011 uses the HTTP protocol, content-type information and status information corresponding to the image format are added to the head of the image data.

The above construction compresses image data by using the relation between image frames, and especially in interval image sensing with slight change, compresses image data by a large data amount. This reduces the amount of communication when the image data are read, thus greatly shortens communication time.

<Fifth Embodiment>

In the third embodiment, the same camera angle is designated for interval image sensing. Next, a fifth embodiment will be described as an example where repetitive image sensing by adding a definition of a control variable immediately before the image-sensing time. In the reservation command, the image-sensing condition such as a camera angle and the image format are designated after the image-sensing time, similar to the above embodiments.

The definition of the control variable is described as "$(definition main body)". The definition main body is described by two ways of representation. One description is designating an initial value, an end value, and an increment. It is further divided into two descriptions depending on whether the increment is positive or negative. The other description is designating all the values of the control variable.

$(<control variable>=<initial value>,upto<end value>, up<increment>)

$(<control variable>=<initial value>,downto<end value>, down<increment>)

or $(<control variable>=<value 1>,<value 2>,<value 3>,<value 4>, . . . <value n>)

Note that <control variable> is a character string, comprising at least one alphabet letter, as an identifier of the control variable.

The reference of the control variable is described as "$(reference main body)" The reference main body is operation using the four arithmetic rules (addition, subtraction, multiplication and division) including the control variable.

For example, if image sensing is programmed with image-sensing time of 13:15 on Jul. 6, 1996, and with pan angle of 25°, tilt angle of 0°, and 3 times zooming, pan angle of 30°, tilt angle of 0°, and 3 times zooming, pan angle of 35°, tilt angle of 0°, and 3 times zooming, That is, to program "image sensing while changing the pan angle by 5°), with intention to read three images in "gif" format later, the reservation command is described as follows:

"http://www.foo.co.jp/R$(pan=25,upto35,up5)1996.7.6.13. 15P$(pan)T0Z3.gif"

or

"http://www.foo.co.jp/R$(pan=0,upto10,up5)1996.7.6.13. 15P$(pan+25)T0Z3.gif"

or

"http://www.foo.co.jp/R$(pan=35,downto25,down5) 1996.7. 6.13.15P$(pan)T0Z3.gif"

or

"http://www.foo.co.jp/R$(pan=25,30,35)1996.7.6.13.15P$ (pan)T0Z3.gif"

Note that it is impossible to perform image sensing to obtain a plurality of video images at the same time. Actually, image sensing is performed at intervals depending on the operation speed of the camera panhead.

Figure 8:
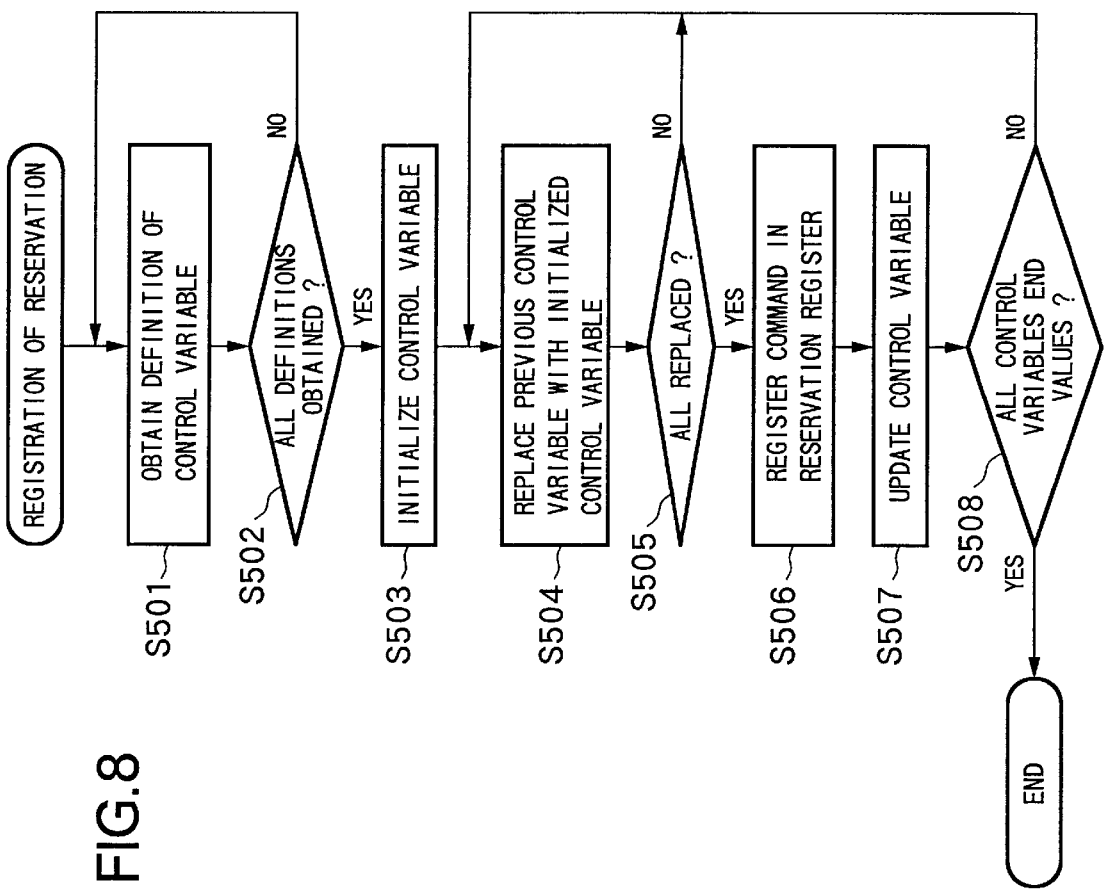
FIG. 8 is a flowchart showing a reservation registration process procedure according to a fifth embodiment of the present invention.

Although the basic construction of the fifth embodiment is the same as that of the second embodiment, step S106 in the processing procedure by the command interpretation 1012 is changed as shown in FIG. 8. Note that if the character subsequent to "R" is "$", as the definition of a control variable is described, the reservation command is described in accordance the fifth embodiment.

First, at step S501, one control variable definition which starts with "$(" and ends with ")" is obtained, and at step S502, it is determined whether or not all the definitions have been obtained.

After all the definitions have been obtained, the control variable is initialized at step S503.

At step S504, the rest of the command is scanned to find a control variable reference which starts with "$(" and ends with ")", and previously initialized corresponding variable is replaced with the obtained control variable reference. When the replacement for the number of control variables has been completed, the process proceeds to step S506, at which the character string obtained by the above processing is interpreted as a reservation command for the above-described repetitive image sensing. Then the programmed image sensing is registered with the same reservation code generated at step S105 and image format, and with designated image-sensing times and image-sensing conditions designated by the respective reservation commands, as a plurality of reservations, into the reservation register 1014.

At step S507, the control variable at each repeated image sensing is updated to the next stage. Then the processing at step S504 and the subsequent steps is repeated until it is determined at step S508 that all the control variables have reached end values.

As a result, the reservation table as shown in FIG. 18 by interpreting the reservation command is produced. Note that as described above, although the respective image-sensing times are the same, it is impossible to perform image sensings at the same time. Actually, the image sensing is sequentially performed in the order of the numerals added to the common part of the acceptance code ("12543").

Thus, the above construction enables to easily perform interval image sensing while changing the camera angle by a short command.

Further, the present embodiment uses only one definition of control variable, however, a plurality of definitions can be described as nested definition.

In the fifth embodiment, repetitive construction is introduced; similarly, other constructions such condition-judgment, definition of variable, substitution of variable, operation using for arithmetic rules and the like, can be introduced.

That is, it may be arranged such that the command interpreter is realized as a program interpreter, to store the content of a URL as a program, and interpret and perform the program.

This enables to automatically perform even complicated camera control.

<Sixth Embodiment>

In the fifth embodiment, the camera angle of programmed image sensing must be designated in the same URL.

Then, a sixth embodiment will described as an example where a part of a reservation command is separately registered as a macro library.

In this embodiment, data describing image-sensing time and image-sensing condition (text file) stored in a secondary external device (arbitrary server on the network).

For the purpose of explanation, it is assumed that image sensing is programmed with image-sensing time of 13:00 on Jul. 6, 1996, while changing the camera angle by every minute as follows:

pan angle of 25°, tilt angle of 0°, 3 times zooming (Jul. 6, 1996 13:00)

pan angle of 30°, tilt angle of 0°, 3 times zooming (Jul. 6, 1996 13:01)

pan angle of 35°, tilt angle of 0°, 3 times zooming (Jul. 6, 1996 13:02)

pan angle of 35°, tilt angle of 1°, 4 times zooming (Jul. 6, 1996 13:03)

pan angle of 35°, tilt angle of 2°, 4 times zooming (Jul. 6, 1996 13:04)

pan angle of 35°, tilt angle of 3°, 5 times zooming (Jul. 6, 1996 13:05)

pan angle of 35°, tilt angle of 4°, 5 times zooming (Jul. 6, 1996 13:06)

pan angle of 35°, tilt angle of 5°, 6 times zooming (Jul. 6, 1996 13:07)

pan angle of 35°, tilt angle of 5°, 7 times zooming (Jul. 6, 1996 13:08)

pan angle of 35°, tilt angle of 5°, 8 times zooming (Jul. 6, 1996 13:09)

A file containing commands designating the above image-sensing conditions and image-sensing times is stored into the secondary external device as:

http://www.bar.co.jp/camcon-a.ctl

That is, the address of the secondary external device is "www.bar.co.jp".

In this case, the content of the file is, for example, as follows:

R1996.7.6.13.0P25T0Z3+R1996.7.6.13.1P30T0Z3+
R1996.7.6.13.2P35T0Z3+R1996.7.6.13.3P35T1Z4+
R1996.7.6.13.4P35T2Z4+R1996.7.6.13.5P35T3Z5+
R1996.7.6.13.6P35T4Z5+R1996.7.6.13.7P35T5Z6+
R1996.7.6.13.8P35T5Z7+R1996.7.6.13.9P35T5Z8.gif The reservation command to be provided to the camera control apparatus starts with "%23(", then has the URL, and ends with ") ". In the above case, as it is necessary to inform the address of the command file, the reservation command is described as follows:

"http://www.foo.co.jp/%23(httpd%3A//www.bar.co.jp/camc on-a.ct1)"

Figure 9:
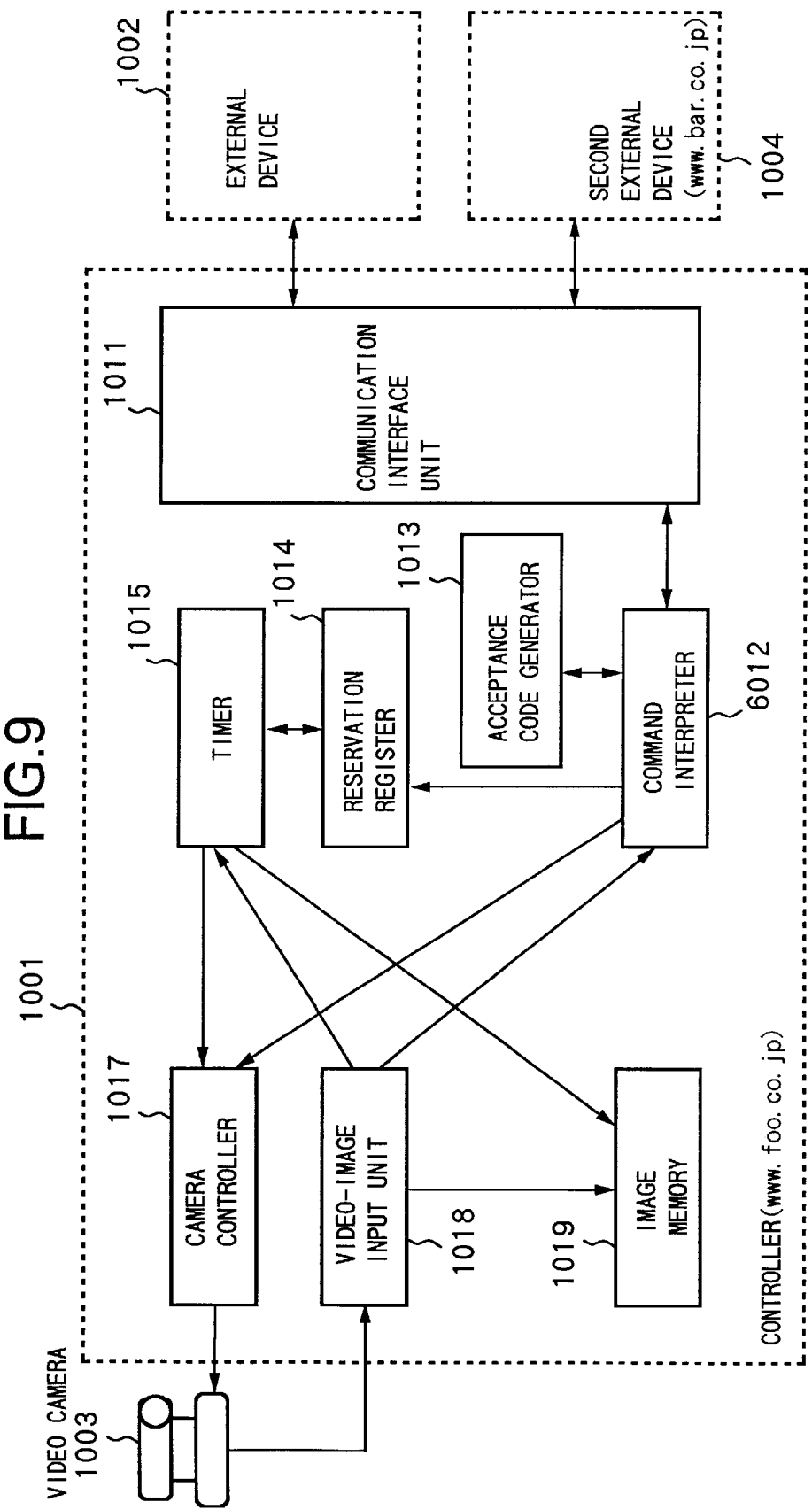
FIG. 9 is a block diagram showing the construction of the camera control apparatus according to a sixth embodiment of the present invention.

The basic construction of the sixth embodiment is as shown in FIG. 9. In comparison with the fifth embodiment, difference is that a command interpreter 6012 interprets the above reservation command and the camera control apparatus is connected to a secondary external device (a server in which the file including the command character string is stored) 1004.

Figure 10:
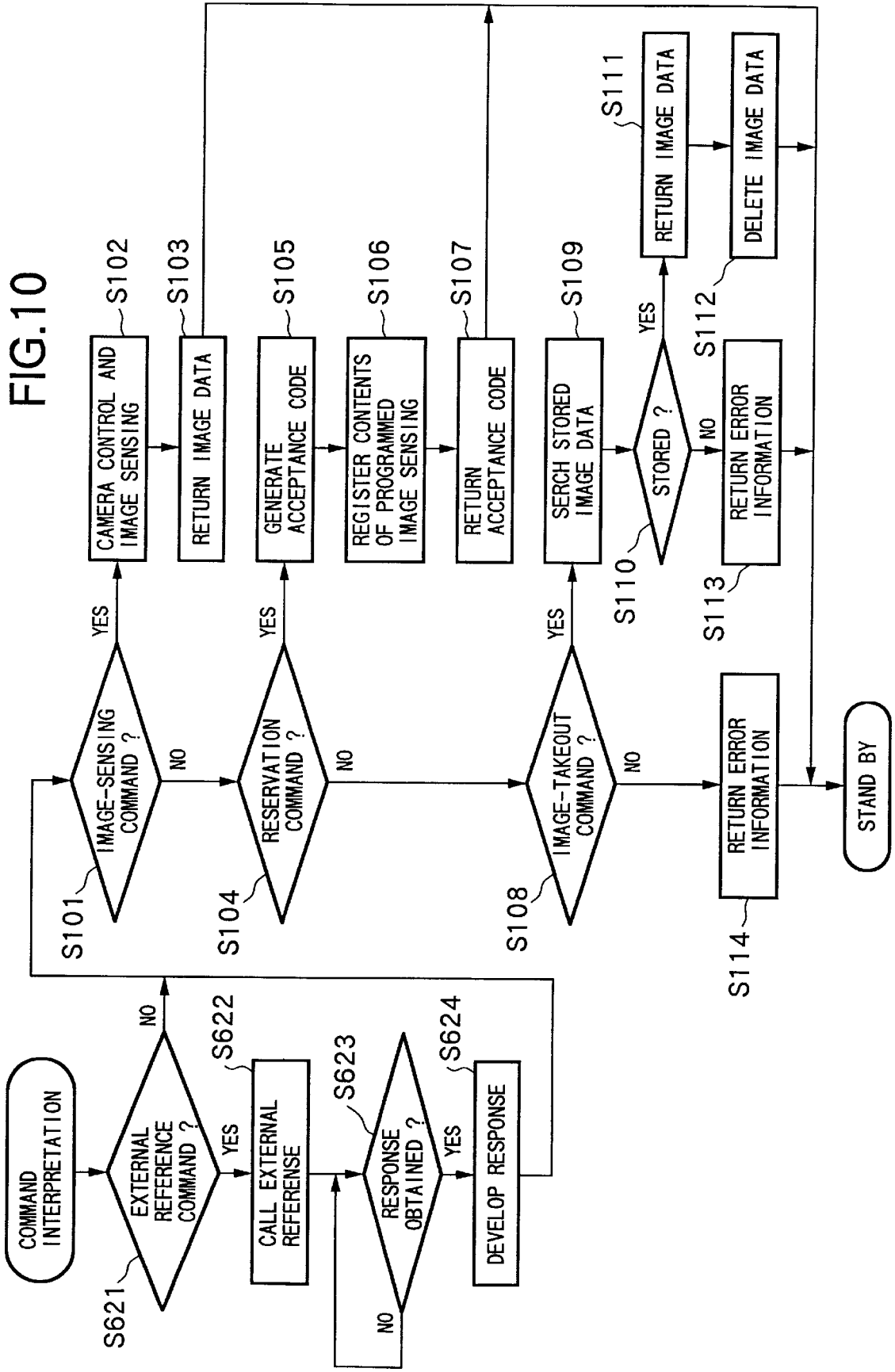
FIG. 10 is a flowchart showing a control-variable replacement process procedure according to the sixth embodiment.

Next, the operation of the command interpreter 6012 will be described with reference to the flowchart of FIG. 10.

At step S621, if the head of the command is "%23", it is recognized as an external reference command, then process proceeds to step S622.

At step S622, a bracketed description "( )" is regarded as a URL designating the stored file in which the command is described, and a file transfer request is issued in accordance with the URL. In the above case, as the file "camcon-a.ctl" is stored at "www.bar.co.jp", the file transfer request is sent to the secondary external device 1004 in FIG. 10.

At step S623, a response is awaited. As a result, a long reservation command as above is returned. The returned reservation command is developed by interpreting the external reference command and replacing it in the developed command, for use in the subsequent command interpretation (step S624). Then the process proceeds to step S101.

Note that at step S621, if the command is not an external reference command, the process also proceeds to step S101. The processing at step S101 and the subsequent steps is identical to that described in the first embodiment, therefore, explanation of those steps will be omitted.

Further, the processing at steps S621 to S624 can be applied to the second to fifth embodiments as well as the first embodiment.

The above construction enables to easily perform interval image sensing programmed with complicated changes of time and camera angle by a short command.

Especially, in accordance with the sixth embodiment, in a case where a plurality of camera control apparatuses (i.e., a plurality of cameras) are provided on the Internet, an image in the same image-sensing status can be obtained by the respective camera control apparatuses by using a file describing a reservation command of programmed image sensing which is stored into only one server.

For example, even when a plurality of camera control apparatuses are provided at various places in various countries, images can be obtained by their own respective image-sensing conditions, and further, an image can be obtained in accordance with image-sensing condition registered by a third person.

In the sixth embodiment, the camera control apparatus and the external apparatus holding the camera control file are described as separate apparatus, however, they may be integrated as a single apparatus. In this case, the URL is described as follows:

"http://www.foo.co.jp/%23(http%3A//www.foo.co.jp/camco n-a.ctl)"

Otherwise, in case of the same URL:

"http://www.foo.co.jp/%23(camcon-a.ctl)"

If the command is stored in the external device to which an image transfer request is issued, the address of the device can be used. In such case, the secondary external device is unnecessary.

Further, although not especially described in the present embodiment, if a plurality of camera-control right requests (i.e., request for right to the change camera angle and the like and transfer the obtained video image) have been issued by a plurality of end users at the same time, the camera control right is given to one of them. It is arranged, for example, such that the user whose request has been first stored in the queue of requests can obtain the camera control right. Otherwise, it may be arranged such that a specific user or the like can obtain the camera control right prior to other users.

However, the camera control right is not directly related with the present invention, therefore, further explanation of the camera control right will be omitted.

As described above, according to the first to sixth embodiments, it is possible to provide an end user with environment to easily remote-control a video camera via a general network such as the Internet.

<Seventh Embodiment>

In the above first to sixth embodiments, obtained video image data,is temporarily stored as a file, and the file is transferred. Especially, even if the reservation command that starts with "R" is not used, every video image data is temporarily stored as a file before it is transferred, which causes several seconds delay. In the fifth embodiment, a moving image is transferred as a file.

Next, a seventh embodiment will be described as an example where realtime moving image (live video image obtained by a camera at that instant) is provided to a client by transferring video image data obtained in realtime.

For the sake of simplification, it is assumed that the video camera has a capability to input video images in unit of $\frac{1}{60}$ second, and that the obtained video images are sequentially transferred.

The problem to be solved in this embodiment is that when a moving video image is transferred in realtime on the Internet and displayed, for example, the effect of traffic on the communication line cannot be ignored.

In case of realtime video image, even if the camera can obtain 60 frames in one second, the number of frames which can be actually transferred changes due to the traffic congestion on the network. For example, even if it is initially intended to transfer video images at $\frac{1}{60}$ sec. intervals, the rate may become $\frac{1}{30}$ sec. when the traffic is heavy. In such case, the video images are of no value when they are simply transferred. As the video images sensed at fixed intervals cannot be transferred at fixed intervals to the request originator, the images reproduced and displayed on the request originator side are unnatural.

Then, in the seventh embodiment, upon transferring a moving image to a moving-image request originator, the camera control apparatus detects the effect of traffic (the degree of congestion on the communication line), and transfers obtained video images in accordance with the detected result.

Specifically, when image data for one frame is transferred to the transfer request originator, an acknowledgment is returned from the transfer request originator. The time from a point where the transfer was started to a point where the acknowledgment has been returned is measured, thus the traffic condition is detected by the measured time. Note that since the amount of data transferred for one frame is known immediately before the transfer, the system may be designed to determine the traffic condition by the amount of data and the response time of the acknowledgment. Further, in accordance with circumstances, a dummy file of an appropriate size (known) may be transferred so as to the measure time when an acknowledgment has been received.

Then, it is assumed that the detected result as the traffic condition is basically the same as the actual traffic condition upon the next video-image transfer, and the video-image transfer is controlled in accordance with the detected result.

In this embodiment, it is assumed that the camera has a capability of inputting video images at $\frac{1}{60}$ sec., and input frames are defined as F1, F2 . . . Fn. In a case where a frame F1 is transferred and an acknowledgment is returned after $\frac{1}{30}$ sec., if the next frame F2 is transferred before the acknowledgment has been received, the subsequent frame cannot be transferred "in realtime" any more. Accordingly, frame F3 is transferred in place of the frame F2. In the transfer of the frame F3, the time until an acknowledgment is returned is measured for controlling the next frame transfer. Note that when an acknowledgment is returned in $\frac{1}{15}$ sec., one of four frames is transferred.

In the above control, at least when the traffic congestion on the communication line is not so heavy, the video-image transfer request originator can see a realtime moving image obtained by substantially utilizing the image-sensing capability of the camera to the full extent, and even when the communication line is overcrowded, the video image can be displayed in realtime.

Note that since some frames are skipped in accordance with the status of the communication line, the MPEG method including coding of interframe difference cannot be employed. Then the seventh embodiment employs the motion JPEG method which performs coding in frame units.

Further, as the information amount of one coded frame is not a fixed size with respect to all the frames, the time necessary for transferring one frame more or less changes at each frame. However, transmitted data is controlled such that the amount of change is within an allowable range, therefore, such change causes no problem.

Figure 13:
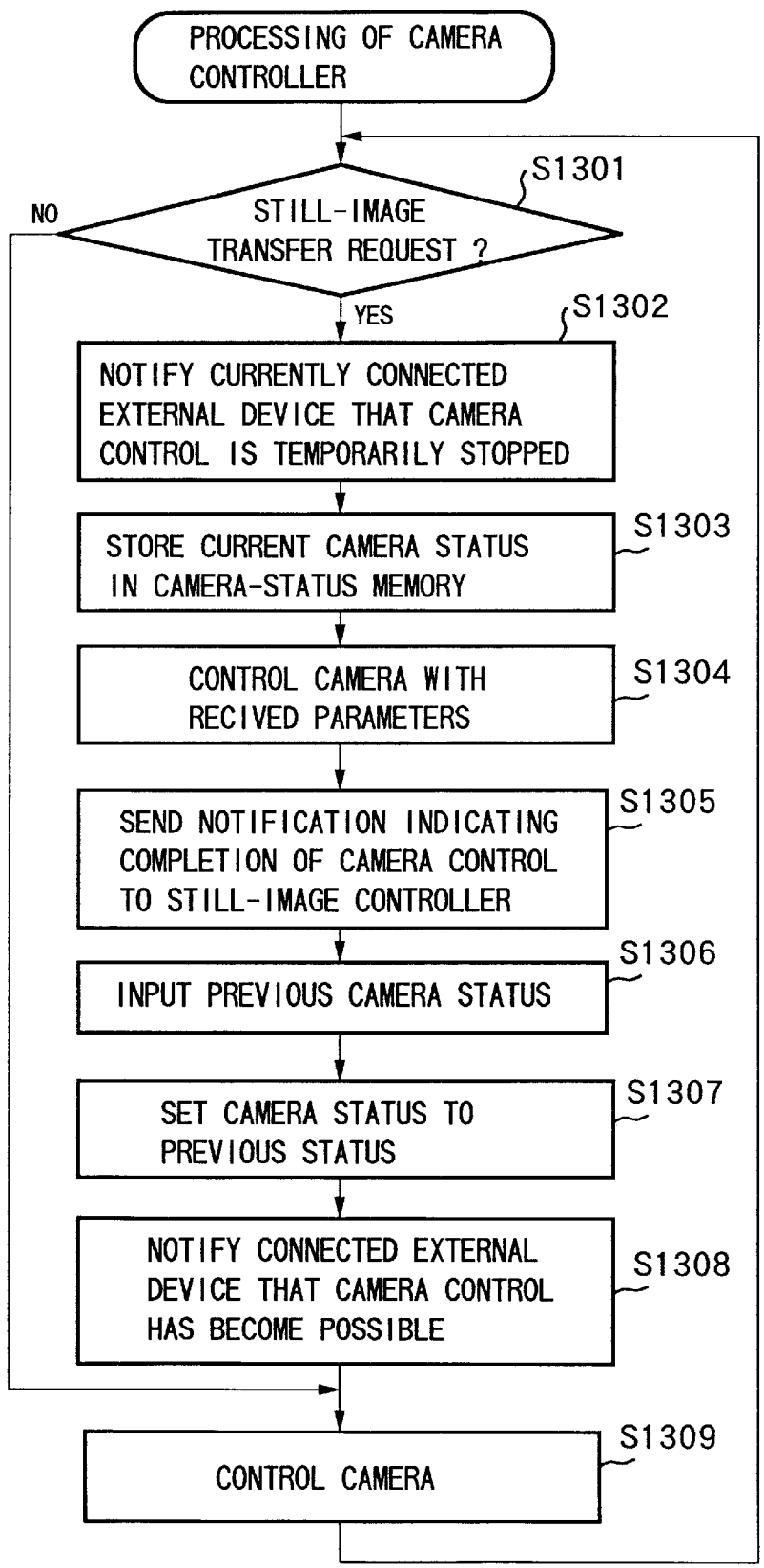
FIG. 13 is a flowchart showing the operation of the camera controller according to the seventh embodiment.
Figure 14:
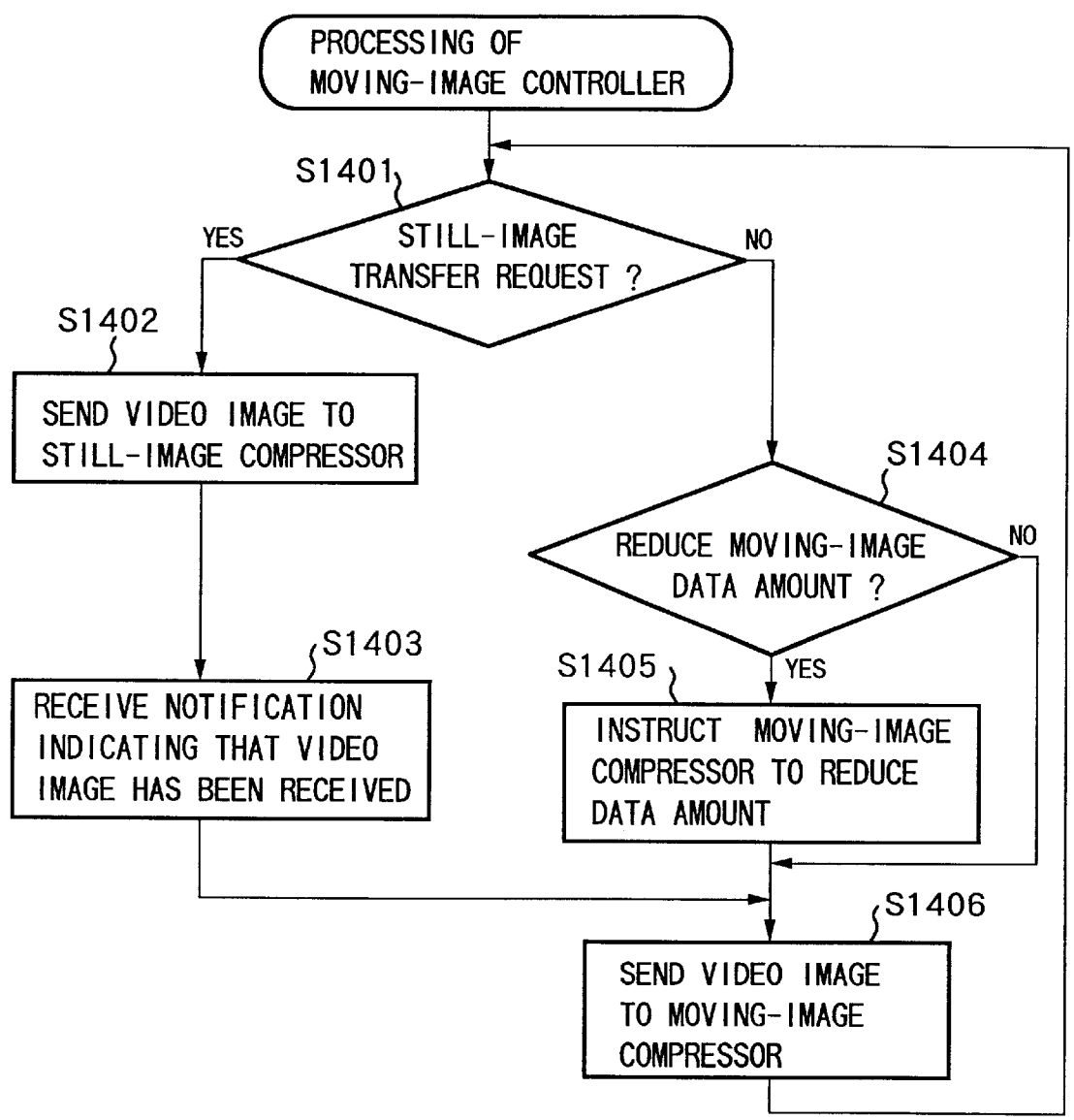
FIG. 14 is a flowchart showing the operation of a moving-image controller according to the seventh embodiment.
Figure 15:
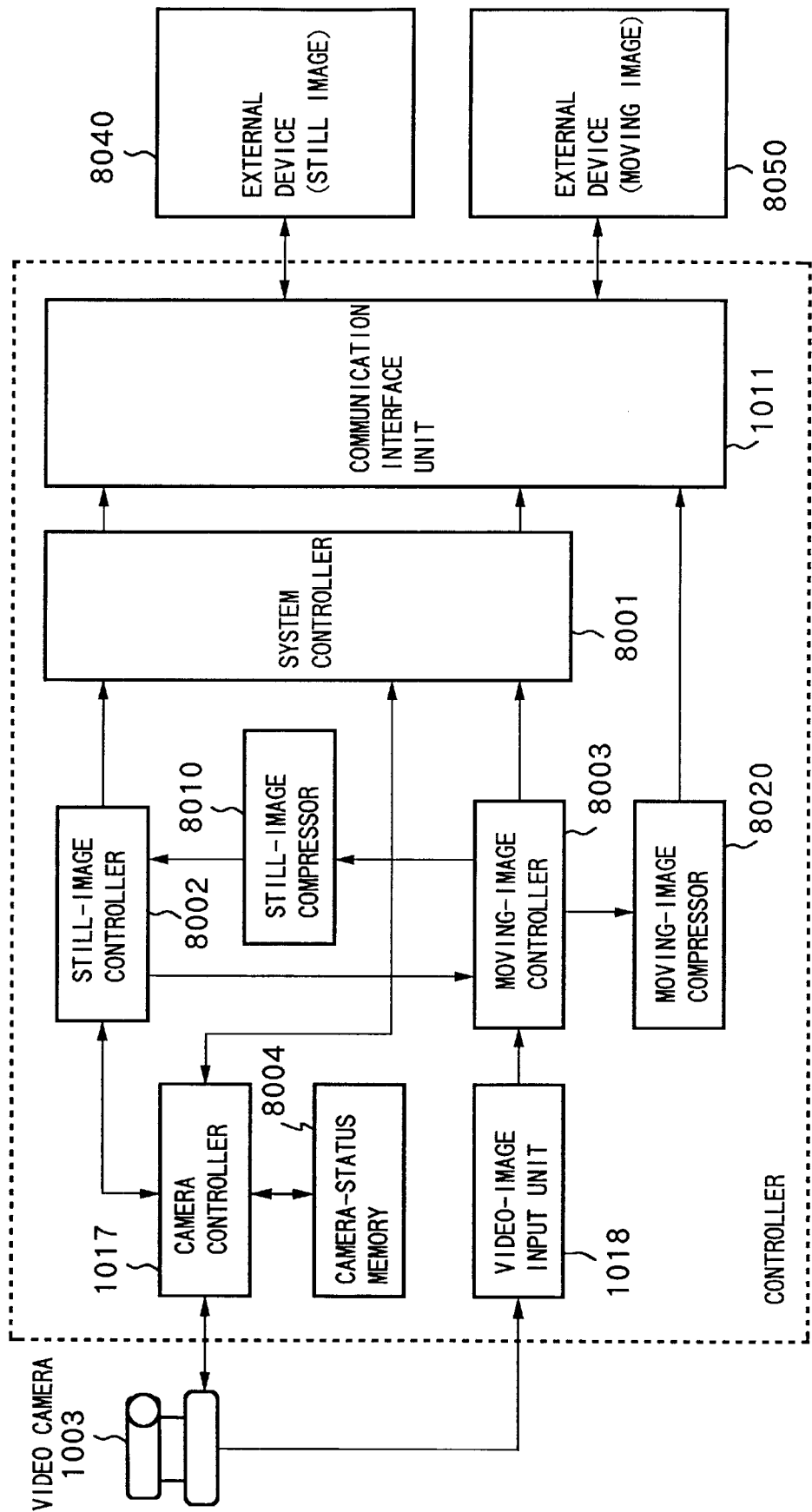
FIG. 15 is a block diagram showing the construction of the camera control apparatus according to the seventh embodiment.

Next, the operation of the seventh embodiment will be described with reference to the flowcharts of FIGS. 11 to 14 and the block diagram of FIG. 15 showing the construction of the camera control apparatus.

In FIG. 15, numeral 1011 denotes a communication interface unit of the camera control apparatus (camera server) as a WWW interface. The communication interface unit 1011 interprets data described in the HTML and operates in accordance with the HTTP protocol. Numeral 8001 denotes a system controller which controls the overall camera control apparatus. The system controller 8001 mainly controls a still-image controller 8002, a moving-image controller 8003 and the camera controller 1017. In this system, a camera-status memory 8004 for storing operation status (statuses such as panning, tilting and zooming) of the camera 1003 is provided.

Figure 11:
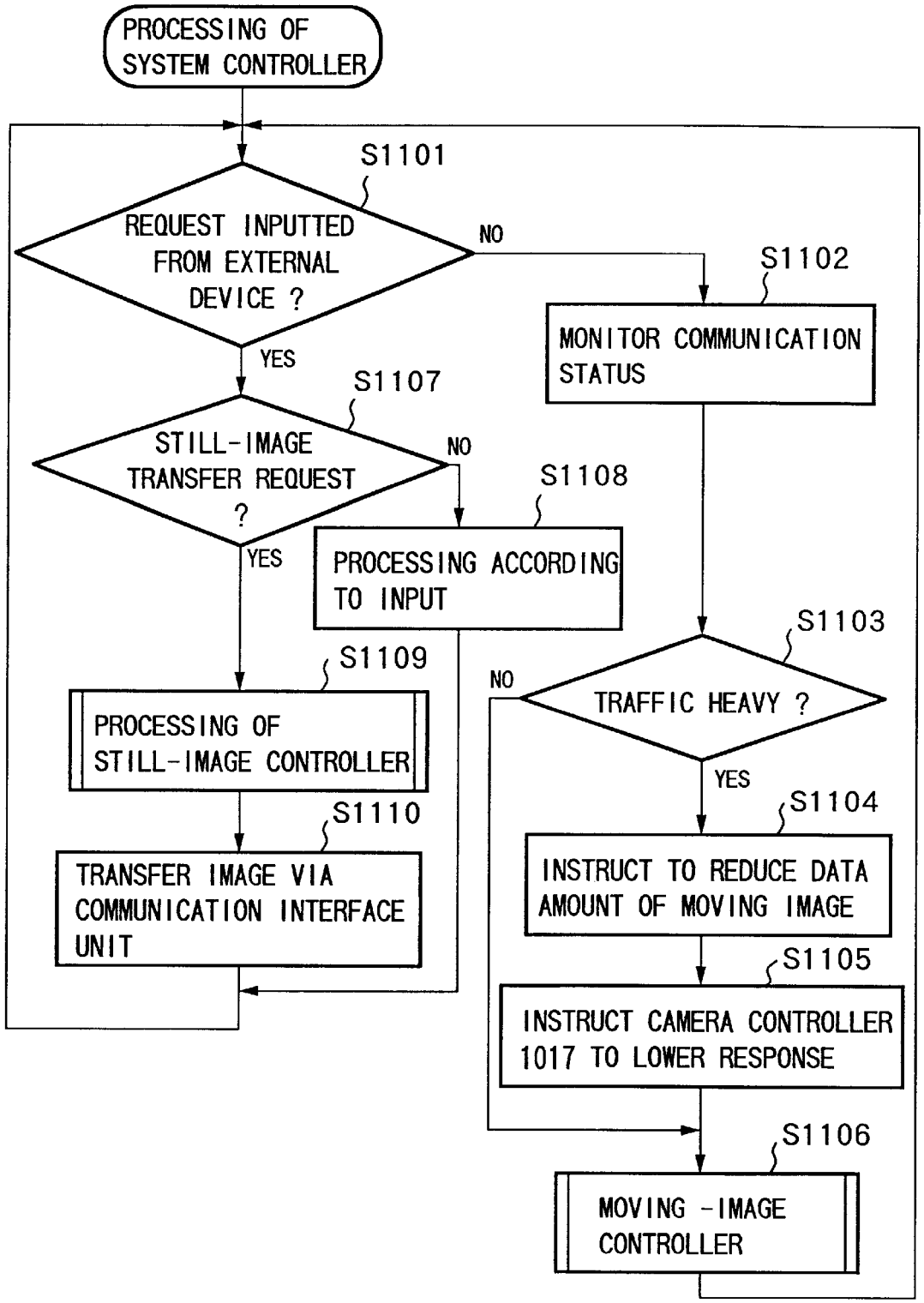
FIG. 11 is a flowchart showing the operation process procedure of a system controller according to a seventh embodiment of the present invention.

FIG. 11 is a flowchart showing the operation process procedure of the system controller 8001 according to the seventh embodiment. Note that the flowchart shows processing when an already-sensed video image is transferred as a moving image to an external device 8050 requesting the video image.

At step S1101, it is determined whether or not a request has been inputted from the external device. If it is determined that the request has not been received from the external device, the process proceeds to step S1102, at which the communication status is monitored, and it is determined whether or not the traffic is heavy (as described above, it is determined by measuring time until an acknowledgment is returned). If it is determined that the traffic congestion is at a predetermined degree or higher, the process proceeds to step S1104, at which the moving-image controller 8003 is instructed to reduce the data amount of the moving image data per unit time. Similarly, the camera controller 1017 is instructed to take operation response corresponding to the traffic congestion status.

For example, if the traffic is heavy, the camera controller 1017 is instructed to lower the operation response speed of the camera.

The camera controller 1107 receives this instruction, and lowers drive speeds of panning, tilting and zooming of the camera 1003. That is, the camera controller 1107 controls the camera so as to lower the operation response to instructions to change the pan angle, the tilt angle and the zooming ratio. For example, during image sensing, if a request in the format as described in the above embodiments is received and panning and the like are performed, video images are transferred at long intervals due to heavy traffic, thus a video image obtained at a greatly different angle is transferred. However, as the camera controller 1017 lowers the panning, tilting and zooming operation speeds of the camera 1003, the moving image changes smoothly; if the camera is being panned, video images in mid-course of panning can be transferred.

At step S1106, the moving-image controller 8003 performs selection on image data of respective frames, sequentially obtained by the video-image input unit 1018 so that the data amount of the moving image can be reduced as instructed. The image data of the selected frames are outputted to the moving-image compressor 8020, and then .transferred to the external device 8050 requesting the moving image. Note that if it is determined that the traffic is not heavy, as the processing at step S1104 is not performed, all the image data of the respective frames are sequentially outputted to the moving-image compressor 8020, then compressed by the moving-image compressor 8020, and transferred to the external device 8050.

If it is determined at step S1101 that the request has been received. from the external device 8050 or from an external device 8040, the process proceeds to step S1107.

At step S1107, it is determined whether or not the request is a still-image transfer request. If it is not a still-image transfer request, the process proceeds to step S1108, at which corresponding processing is performed. For example, if it is determined that the request is a moving-image transfer request, video image data the same as the video image data transferred to the external device 8050 is transferred to the external device 8040.

If it is determined that the request is a still-image transfer request, the process proceeds to step S1109, at which the still-image controller 8002 is driven, and at step S1110, the obtained video image is transferred as a still image via the communication interface unit 1011 to the external 8040.

Figure 12:
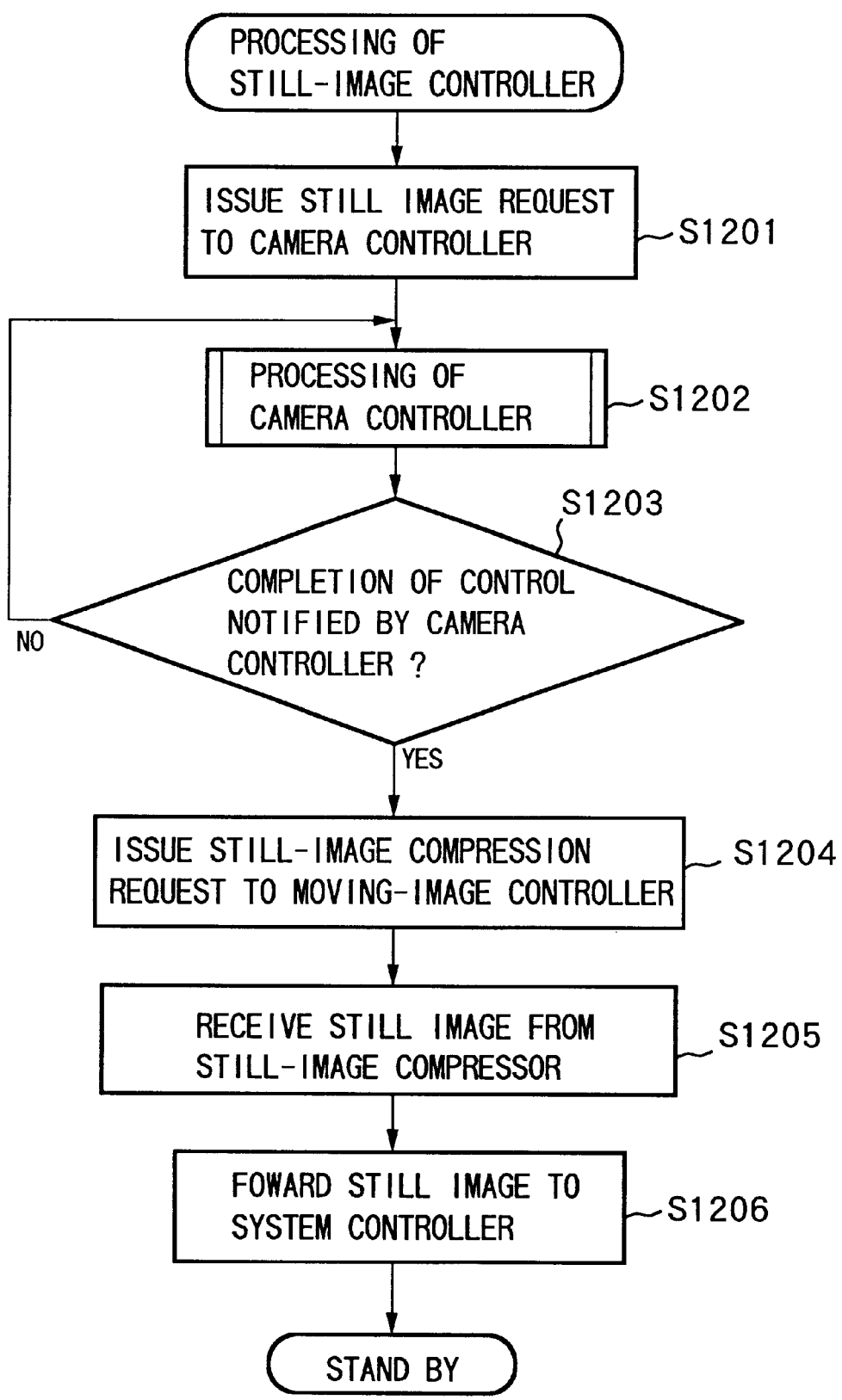
FIG. 12 is a flowchart showing the operation of a still-image controller according to the seventh embodiment.

Next, the processing at step S1109 will be described in detail with reference to the flowchart of FIG. 12. The flowchart shows the operation of the still-image controller 8002.

In case of still image, the image quality must be higher than that of one frame of moving image. In the seventh embodiment, when a still-image transfer request has been received during transferring image data, the camera controller 1017 is driven to temporarily stop the camera 1003 if it is being panned, for still-image sensing, and store the status of the camera 1003 before it has been stopped into the camera-status memory 8004. Then image sensing is performed to obtain a video image as a still image, and the video image is transferred. Thereafter, when the transfer has been completed, the previous camera status (panning) is restored.

More specifically, at step S1201, a still-image transfer request is issued to the camera controller 1017 to control the camera at step S1202. At step S1203, notification from the camera controller 1017, indicating that still-image sensing has become possible, is waited.

When this notification has been received, the process proceeds to step S1204, at which a still-image compression request (to be described in detail later) to the moving-image controller 8003, instructing to output the obtained video image to the still-image compressor 8010.

Then at step S1205, the compressed still-image data is received from the still-image compressor 8010. At step S1206, the still-image data is forwarded to the system controller 8001, then the process enters stand-by status.

Next, the processing at step S1202 will be described with reference to the flowchart of FIG. 13. The processing is performed by the camera controller 1017.

First, it is determined at step S1301 whether or not the request is a still-image transfer request. If it is determined that it is not a still-image transfer request, the camera 1003 is returned to the previous status before the request has been received.

On the other hand, if it is determined at step S1301 that it is a still-image transfer request (e.g., from a user A), the process proceeds to step S1302, at which the external device (moving-image transfer request originator by, e.g., a user B) connected to the apparatus is notified that camera control is temporarily stopped. In response to the notification, the request originator (the user B side) displays a corresponding message in a display window image of e.g. a WWW browser. At step S1303, the current camera status is stored into the camera-status memory 8004.

At step S1304, the camera 1003 set for still-image sensing is controlled with set parameters, and when the control has been completed, completion notification is sent to the still-image controller 8002 at step S1305.

Thereafter, at step S1306, it is confirmed that still image has been inputted, and the stored camera status is read from the camera-status memory 8004. At step S1307, the previous status (moving-image input if moving image was performed before the still-image sensing) is restored.

At step S1308, if there is an external device which has temporarily lost right to camera control (the external device 8050 in this case), the external device is notified that the camera control right has been restored, and at step S1309, the camera control is continued.

Next, the processing of the moving-image controller 8003 when a still-image transfer request at step S1106 in FIG. 11 and when a still-image compression request has been received at step S1204 in FIG. 12 has been received will be described with reference to the flowchart of FIG. 14.

At step S1401, it is.determined whether or not the request is a still-image transfer request. If it is determined that it is not a still-image transfer request, the process proceeds to step S1404, at which it is determined whether or not the data amount of moving image is to be reduced. If it is instructed to reduce the data amount, the process proceeds to step S1405, at which the moving-image compressor 8020 is instructed to reduce the data amount per unit time. At step S1406, the video images are sent to the moving-image compressor 8020, and the compressed moving image is transferred to the request originator (the external device 8050).

On the other hand, if it is determined at step S1401 that the request is a still-image transfer request, the process proceeds to step S1402, at which the video image is sent to the still-image compressor 8010. Then process proceeds to step S1403, at which the video image is compressed as a still image, and it is transferred to the request originator (the external device 8040).

As a result, according to the seventh embodiment, when video image obtained by the camera is transferred in real-time as a moving image, the data amount is reduced in accordance with the degree of traffic congestion on the communication line. This avoids at least the inconvenience that the video image cannot be transferred in "realtime". In a case where the camera angle such as pan angle, a tilt angle and a zooming ratio is changing, and further the communication line is overcrowded, the speed of variable control of the camera angle is lowered. This enables to reproduce smooth and natural moving image on the moving-image requesting side.

Note that in the seventh embodiment, the data amount is reduced by thinning video image data in frame units, however, it may be arranged such that information amount per one frame is reduced. In this case, as there is no omitted frame, MPEG coding, i.e., interframe coding can be adopted. In this method, after orthogonal conversion, a high-frequency component area is masked by "0" data, the amount of coding can be reduced. That is, the size of masked area is changed in accordance with the degree of traffic congestion on the communication line. Note that as the masked area is enlarged, the image quality degrades, however, a moving image can be transferred in realtime.

Figure 19A:
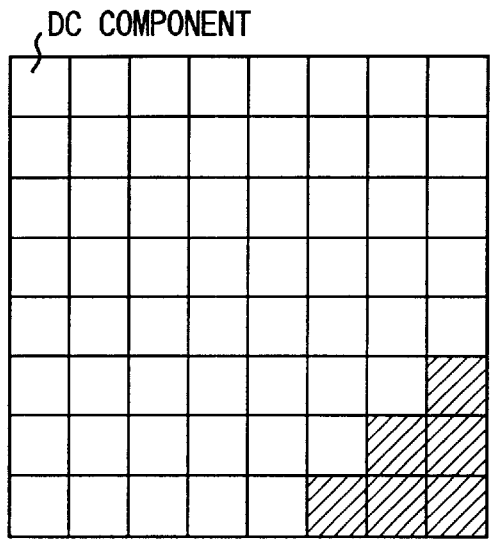
FIGS. 19A to 19C are samples of mask patterns for orthogonal conversion according to the seventh embodiment.
Figure 19B:
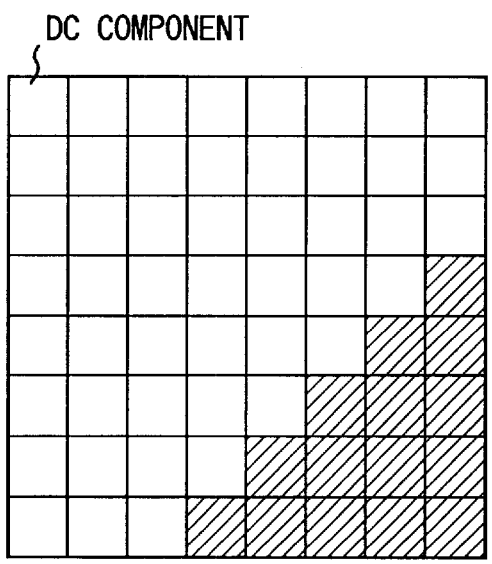
Figure 19C:
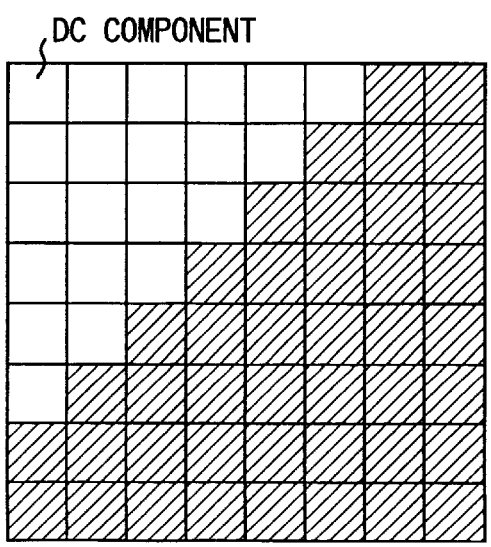

FIGS. 19A to 19C show mask patterns. From FIGS. 19A to 19C, the mask area for the DC component becomes larger, while the coding amount becomes smaller.

Further, in the seventh embodiment, a single camera can be used as a still-image camera and a moving-image camera, and further, both functions can be fulfilled substantially at the same time.

Figure 16:
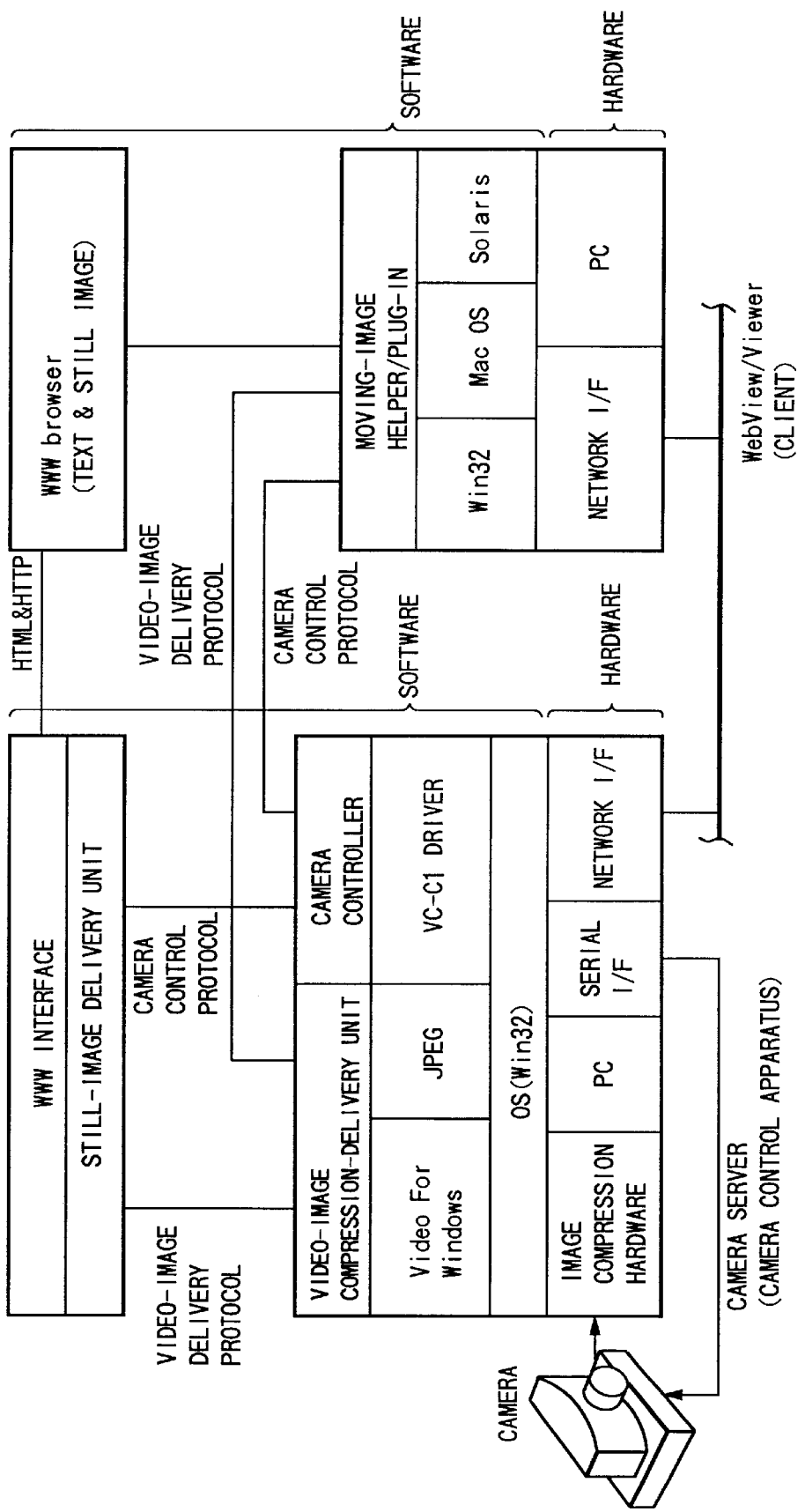
FIG. 16 is a block diagram showing the relation of hardware and software between the camera control apparatus and a client according to the seventh embodiment.

FIG. 16 is a block diagram showing the hardware and software relation between the camera control apparatus (server) and (client) according to the seventh embodiment.

As shown in FIG. 16, a camera server (camera control apparatus) comprises, as its hardware, an information processing device such as a personal computer (PC in FIG. 16), an image compression hardware (video-capture board) for compressing video images obtained by the camera, a network interface, and a serial interface for designating image-sensing condition such as a camera angle.

Similarly, the video-image request originator, i.e., a client device (external device in the embodiment and the like) comprises an information processing device having a network interface.

As for the software, operating systems which run on respective hardware devices (especially PC) are employed. On the client device, various operating systems such as Win32 (provided by Microsoft Corporation), Mac OS (provided by Apple Computer, Inc.) and Solaris (OS that runs on SPARK provided by Sun Microsystems, Inc.) are adoptable. On the camera control apparatus side, Win32, for example, is employed.

The operating system, as above mentioned, executes processings corresponding to the respective processors in the seventh embodiment. In this case, a program which runs on the camera control apparatus has a WWW interface for logical communication with a client (physical communication is performed by a network interface) and a still-image delivery unit which provides environment for the operation of the program. Further, a video-image compression-delivery unit which sends video data to the still-image delivery unit, Video for Windows (standard moving-image processing program)as an actual image compressing program and a JPEG program are incorporated into the operating system. Further, a camera controller which drives the camera, in accordance with camera-control parameters received from the client in the format of camera-control protocol, and a VC-C1 driver which translates the parameters into direct parameters for the hardware of the camera, are incorporated into the operating system.

Next, the operation of the seventh embodiment will be described with FIG. 16 regarding image-data transfer between the server having the WWW interface and the client.

In the present embodiment, the camera server and the client respectively have a construction for still-image transfer/reception and a construction for moving-image transfer/reception. For transmitting/receiving a still image, still image data is transferred as a single image file by a method corresponding to the Internet, i.e., the HTTP protocol. For transmitting/receiving a moving image, image data is transferred by a protocol different from the HTTP protocol.

In the HTTP protocol, still image data is transferred in accordance with a request from a WWW browser, from the camera server to the client, as a single image file. When the transfer has been completed, the data transfer link between the camera server and the client is disconnected.

Further, control information for a video camera having a panhead, more specifically, control information such as panning, tilting and zooming is sent to the camera server by the HTTP protocol.

When a moving image is transferred/received, a large number of still images, constituting the moving image are transferred from the camera server to the client continuously, in other words, without interruption. In this case, the aforementioned camera control information is handled by, not the HTTP protocol but a camera control protocol as shown in FIG. 16.

Note that the VC-C1 driver actually generates camera control data for, e.g., panning of the camera, and it outputs the data via the operating system onto the serial interface.

On the other hand, on the client device side, the WWW browser for displaying video images, characters and the like from the camera control apparatus, and a moving-image helper/Plug-in for sending camera control parameters to the camera control apparatus or receiving moving-image data from the camera control apparatus, operate on the operating system.

Note that as a protocol for transferring a still image in the seventh embodiment, the HTTP protocol, a file-transfer protocol and a protocol corresponding to multicast transfer are employed. The protocols use a control signal to control the camera.

Further, as a protocol for transferring a moving image, a video-image delivery protocol and a camera control protocol are employed. that is, the operation-response characteristic of the camera controller in still-image transfer is different from that in moving-image transfer.

In case of still image transfer, the camera server transfers a video obtained in accordance with the description of the URL to the client, while in case of moving image transfer, to transfer the obtained images more efficiently, a protocol different from that in the still-image transfer is employed.

FIG. 20 shows the respective process procedures of the client and the server.

First, at step S1501, the client side transfers a request packet, to start moving-image transfer request, to the server. The server receives the request packet, and from step S1601 to step S1602, transfers a request acknowledge (ACK) packet, indicating that the request packet has been received, to the client.

The client receives the request acknowledge packet, and transfers a data acknowledge packet, indicating that the acknowledge packet has been received, to the server (step S1503). The server receives the data acknowledge packet from the client (step S1603), and determines that data communication with the client has been established. Next, at step S1604, the server transfers an Info packet to the client. The Info packet includes the information on the size of an image to be transferred.

The client receives the Info packet (step S1504), and transfers an acknowledge packet to the server (step S1505). The server receives the acknowledge packet (step S1605), then at step S1606, the amount of data is determined.

If step S1606 is first executed, this process is skipped, and at step S1607, a video-image frame obtained by image sensing is transferred as image data to the client.

On the client side, the processing at above steps S1505 to S1507 is repeated until it is determined at step S1507 that disconnection of the communication link has been instructed from, e.g., an operator. Similarly, on the server side, the processing at above steps S1605 to S1607 is repeated until it is determined at step S1608 that the communication link has been disconnected.

Note that in the repetitive processing, on the server side, at step S1606 at the second or subsequent processing, the amount of data per unit time is determined in accordance with the time from a point where the image data of sensed video image has been transferred at step S1607 to a point where the data acknowledge packet has been received from the client at step S1605. As described above, this processing is made so as to omit a sensed video image that has become old. Further, it may be arranged such that, a masked area in orthogonal conversion is changed to reduce the data amount.

As a result, every time one frame for a moving image has been transferred, the server can transfer the next frame merely based on the time when acknowledge packet has been received.

Figure 21:
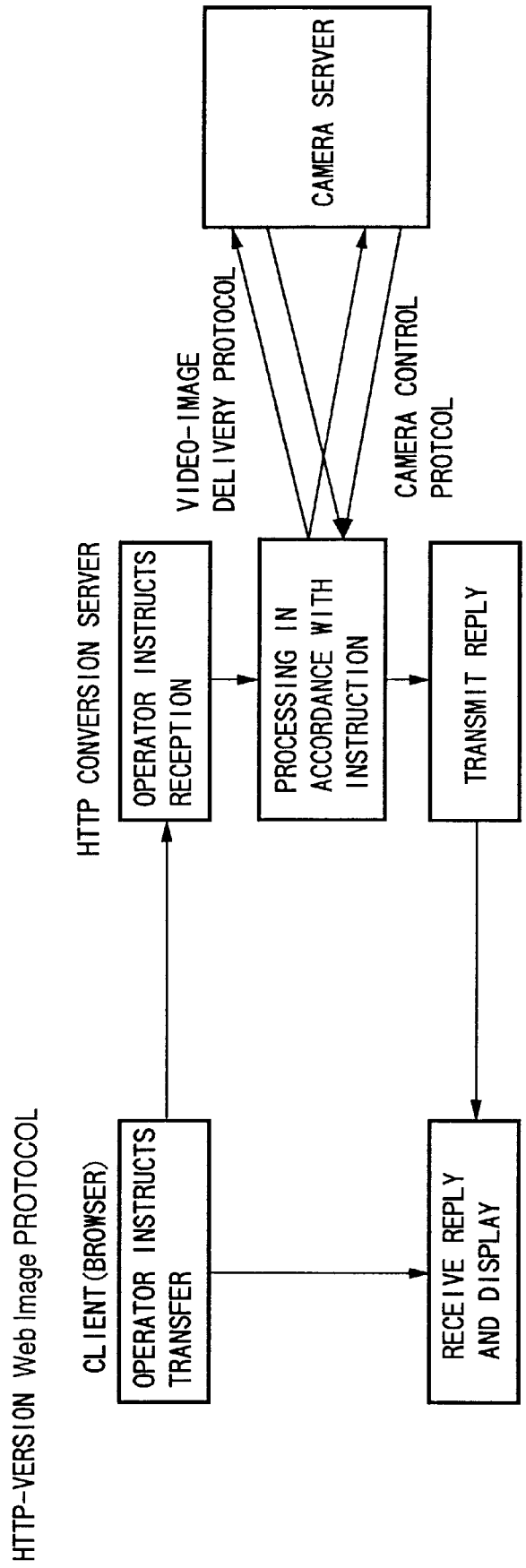
FIG. 21 is a flowchart showing the operation of the client and server in still-image transfer.

As shown in FIG. 21, in case of still-image transfer, every time a transfer request has been made for one still image, the client transfers a URL description to the server in accordance with the HTTP protocol. The server performs processing (image sensing) in accordance with the received description, and transfers the result of processing (video image data) to the client. In case of moving image, image transfer is not completed by transferring one image frame, the next frame is transferred in accordance with the time when acknowledge packet has been received.

Note that even during moving-image transfer, the user of the client side can change the camera angle. This is made by using a channel (control channel) different from a video-image transfer channel, by the client side, with a dedicated command instead of the above-mentioned URL.

More specifically, a basically 16-byte size Set packet from the client side via the control channel to the server may be used. The server returns an Answer packet.

The Set packet includes a command number which is a command to the server and which indicates the type of command, and a control value of the command. As described above, these packets are transferred via the control channel.

Further, although not especially described in the present embodiment, if a plurality of camera-control right requests (i.e., request for right to change the camera angle and the like and transfer the obtained video image) have been issued from a plurality of users at one time, the camera control right is given to one of them. It is arranged, for example, such that the user whose request has been first stored in the queue of requests can obtain the camera control right. Otherwise, it may be arranged such that a specific user or the like can obtain the camera control right prior to other users.

However, the camera control right is not directly related with the present invention, therefore, further explanation of the: camera control right will be omitted.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, according to the present invention, live video images obtained by a video camera can be sequentially transferred as a moving image via a general network such as the Internet.

As many apparently widely different embodiments of the present invention can be made without departing from the spirit and scope thereof, it is to be understood that the invention is not limited to the specific embodiments thereof except as defined in the appended claims.

What is claimed is:

1. An image-sensing server, connected to a general network, capable of controlling image-sensing means, comprising:

transfer means for transferring a series of video images, obtained by said image-sensing means, to a client device on the network, as a moving image;

detection means for detecting the degree of traffic congestion on the network; and control means for controlling a data amount of video images transferred by said transfer means, in accordance with the result of detection by said detection means;

wherein said detection means detects the degree of traffic congestion on the network by measuring time from a point where data transfer has been started to a point where an acknowledgment signal is received from a transfer destination, and wherein said control means controls the video images from said image-sensing means by controlling operation response of said image-sensing means, in accordance with the degree of traffic congestion on the network detected by said detection means.

2. The image-sensing server according to claim 1, wherein said transfer means compresses the video images into motion JPEG format data.

3. The image-sensing server according to claim 2, wherein if it is determined by the result of detection by said detection means that the degree of traffic congestion on the network is high, said control means lowers the operation response of said image-sensing means.

4. The image-sensing server according to claim 1, wherein said control means controls a thinning amount of the video images by selecting a frame to be skipped.

5. The image-sensing server according to claim 1, wherein said transfer means compresses the video images into MPEG format data and transfers the data, and wherein said control means controls the data amount by controlling a mask area of high-frequency component obtained by orthogonal conversion performed in MPEG compression.

6. The image-sensing server according to claim 1, further comprising:

determination means for determining whether or not a still-image transfer request has been received from the client device;

second transfer means for, if said determination means determines that the still-image transfer request has been received while the moving image is transferred, temporarily saving control status of said image sensing means, setting said image sensing means for still-image sensing and controlling said image sensing means to perform image sensing, encoding obtained still image by a predetermined coding processing, and transferring the coded still image to said client device; and restoring means for, when transfer of the still image has been completed, restoring the control status saved by said second transfer means and continuing transfer of the moving image.

7. The image-sensing server according to claim 6, further comprising notification means for notifying the client device, which has received the moving image, that control right has been temporarily lost when the still image is transferred by said second transfer means.

8. A control method for an image-sensing server, connected to a general network, capable of controlling image-sensing means, comprising:

a transfer step of transferring a series of video images, obtained by said image-sensing means, to a client device on the network, as a moving image;

a detection step of detecting the degree of traffic congestion on the network; and a control step of controlling a data amount of video images transferred at said transfer step, in accordance with the result of detection at said detection step;

wherein at said detection step, the degree of traffic congestion is detected on the network by measuring time from a point where data transfer has been started to a point where an acknowledgment signal is received from a transfer destination, and wherein at said control step, the video images from said image-sensing means are controlled by controlling operation response of said image-sensing means, in accordance with the degree of traffic congestion on the network detected at said detection step.

9. The control method according to claim 8, wherein at said transfer step, the video images are compressed into motion JPEG format data.

10. The control method according to claim 9, wherein if it is determined at said detection step that the degree of traffic congestion on the network is high, the operation response of said image-sensing means is lowered at said control step.

11. The control method according to claim 8, wherein at said control step, a thinning amount of the video images is controlled by selecting a frame to be skipped.

12. The control method according to claim 8, wherein at said transfer step, the video images are compressed into MPEG format data and transferred, and wherein at said control step, the data amount is controlled by controlling a mask area of high-frequency component obtained by orthogonal conversion performed in MPEG compression.

13. The control method according to claim 8, further comprising:

a determination step of determining whether or not a still-image transfer request has been received from the client device;

a second transfer step of, if it is determined at said determination step that the still-image transfer request has been received while the moving image is transferred, temporarily saving control status of said image sensing means, setting said image sensing means for still-image sensing and controlling said image sensing means to perform image sensing, encoding obtained still image by a predetermined coding processing, and transferring the coded still image to said client device; and a restoring step of, when transfer of the still image has been completed, restoring the control status saved at said second transfer step and continuing transfer of the moving image.

14. The control method according to claim 13, further comprising a notification step of notifying the client device, which has received the moving image, that control right has temporarily lost when the still image is transferred at said second transfer step.

15. A computer-readable storage medium containing program codes for executing processing by a computer connected to image sensing means, comprising:

transfer-process program codes for executing processing for transferring a series of video images obtained by said image sensing means to a client device on a network, as a moving image;

detection-process program codes for executing processing for detecting the degree of traffic congestion on the network; and control-process program codes for executing processing for controlling a data amount of video images transferred by said transfer means, in accordance with the result of detection by said detection means;

wherein at said detection-process program codes, the degree of traffic congestion is detected on the network by measuring time from a point where data transfer has been started to a point where an acknowledgment signal is received from a transfer destination, and wherein at said control-process program codes, the video images from said image-sensing means are controlled by controlling operation response of said image-sensing means, in accordance with the degree of traffic congestion on the network detected at said detection step.

16. The computer-readable storage medium according to claim 15, wherein said transfer-process program codes compress the video images into motion JPEG format data.

17. The computer-readable storage medium according to claim 16, wherein if it is determined by the result of detection by said detection-process program codes that the degree of traffic congestion on the network is high, said control process program codes lowers the operation response of said image-sensing means.

18. The computer-readable storage medium according to claim 15, wherein said control-process program codes control a thinning amount of the video images by selecting a frame to be skipped.

19. The computer-readable storage medium according to claim 15, wherein said transfer-process program codes compress the video images into MPEG format data and transfers the data, and wherein said control-process program codes control the data amount by controlling a mask area of high-frequency component obtained by orthogonal conversion performed in MPEG compression.

20. The computer-readable storage medium according to claim 15, further comprising:

determination-process program codes for determining whether or not a still-image transfer request has been received from the client device;

second transfer-process program codes for, if said determination-process program codes determine that the still-image transfer request has been received while the moving image is transferred, temporarily saving control status of said image sensing means, setting said image sensing means for still-image sensing and controlling said image sensing means to perform image sensing, encoding obtained still image by a predetermined coding processing, and transferring the coded still image to said client device; and restoring-process program codes for, when transfer of the still image has been completed, restoring the control status saved by said second transfer-process program codes and continuing transfer of the moving image.

21. The computer-readable storage medium according to claim 20, further comprising notification-process program codes for notifying the client device, which has received the moving image, that control right has been temporarily lost when the still image is transferred by said second transfer-process program codes.

* * * * *

UNITED STATES PATENT AND TRADEMARK OFFICE
CERTIFICATE OF CORRECTION

PATENT NO.    : 6,469,737 B1                                        Page 1 of 1
DATED         : October 22, 2002
INVENTOR(S)   : Masaru Igarashi et al.

It is certified that error appears in the above-identified patent and that said Letters Patent is hereby corrected as shown below:

<u>Title page,</u>
Item [56], References Cited, OTHER DOCUMENTS, please add
-- Goldberg K et al., "Desktop Teleoperation via the World Wide Web" IEEE International Conference on Robotics & Automation, US, New York, IEEE, 5/21/95, pp 654-659 --

Signed and Sealed this

Twenty-ninth Day of July, 2003

JAMES E. ROGAN
*Director of the United States Patent and Trademark Office*